United States Patent
Feng

(10) Patent No.: US 11,089,620 B2
(45) Date of Patent: *Aug. 10, 2021

(54) METHOD AND APPARATUS FOR TRANSMITTING FEEDBACK INFORMATION

(71) Applicant: GUANGDONG OPPO MOBILE TELECOMMUNICATIONS CORP., LTD., Guangdong (CN)

(72) Inventor: Bin Feng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/880,879

(22) Filed: May 21, 2020

(65) Prior Publication Data
US 2020/0288493 A1  Sep. 10, 2020

Related U.S. Application Data

(63) Continuation of application No. 15/779,008, filed as application No. PCT/CN2016/077397 on Mar. 25, 2016, now Pat. No. 10,701,721.

(51) Int. Cl.
*H04W 72/12* (2009.01)
*H04L 1/18* (2006.01)
*H04W 24/02* (2009.01)

(52) U.S. Cl.
CPC ....... *H04W 72/1273* (2013.01); *H04L 1/1854* (2013.01); *H04L 1/1861* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 8,792,422 B2 | 7/2014 | Wu | |
| 2009/0207793 A1* | 8/2009 | Shen | H04L 5/0094 370/329 |

(Continued)

FOREIGN PATENT DOCUMENTS

| | | |
|---|---|---|
| CN | 101925110 A | 12/2010 |
| CN | 101932000 A | 12/2010 |

(Continued)

OTHER PUBLICATIONS

International Search Report in the international application No. PCT/CN2016/077397, dated Dec. 30, 2016.

(Continued)

*Primary Examiner* — Diane L Lo
(74) *Attorney, Agent, or Firm* — Ladas & Parry, LLP

(57) ABSTRACT

A method and apparatus for transmitting feedback information are provided. The method comprises: a terminal device receives first downlink data, the first downlink data being borne in a first time-domain resource unit in a first time-domain resource set, the first time-domain resource set comprising at least one time-domain resource unit; the terminal device determines transmitting feedback information for the first downlink data in a second time-domain resource unit according to a location of the first time-domain resource unit in the first time-domain resource set.

10 Claims, 10 Drawing Sheets

(56) References Cited

U.S. PATENT DOCUMENTS

| | | |
|---|---|---|
| 2011/0013613 A1 | 1/2011 | Sung |
| 2012/0093040 A1 | 4/2012 | Wu |
| 2013/0010724 A1* | 1/2013 | Han .................. H04L 5/0053 |
| | | 370/329 |
| 2014/0105076 A1 | 4/2014 | Yang |
| 2015/0043595 A1 | 2/2015 | Reina et al. |
| 2015/0063179 A1 | 3/2015 | Yang et al. |
| 2015/0188687 A1 | 7/2015 | Gao et al. |
| 2015/0257150 A1 | 9/2015 | Yi et al. |
| 2016/0211962 A1* | 7/2016 | Lee .................. H04W 72/0413 |
| 2017/0195087 A1 | 7/2017 | Reina et al. |

FOREIGN PATENT DOCUMENTS

| | | |
|---|---|---|
| CN | 101127584 A | 2/2014 |
| CN | 104301273 A | 1/2015 |
| EP | 2445251 A1 | 4/2012 |
| EP | 2709299 A2 | 3/2014 |
| EP | 2863574 A1 | 4/2015 |
| JP | 2013240063 A | 11/2013 |
| JP | 2014524185 A | 9/2014 |
| WO | 2009116790 A2 | 9/2009 |
| WO | 2013144905 A1 | 10/2013 |
| WO | 2014021649 A1 | 2/2014 |
| WO | 2014187141 A1 | 11/2014 |
| WO | 2015131730 A1 | 9/2015 |
| WO | 2015200804 A1 | 12/2015 |

OTHER PUBLICATIONS

English translation of the Written Opinion of the International Search Authority in the international application No. PCT/CN2016/077397, dated Dec. 30, 2016

First Office Action of the Japanese application No. 2018-532410, dated Jan. 7, 2020.

Supplementary European Search Report in the European application No. 16894926.1, dated Oct. 25, 2019.

Partial Supplementary European Search Report in the European application No. 16894926.1, dated May 28, 2019.

First Office Action of the Taiwanese application No. 106110047, dated Apr. 30, 2020.

OPPO. "HARQ-ACK transmission on eLAA carrier", 3GPP TSG RAN WG1 Meeting #84 R1-160595, Feb. 5, 2016, section 2.

First Office Action of the European application No. 16894926.1, dated Jul. 3, 2020.

First Office Action of the Indian application No. 201817026301, dated Jul. 21, 2020.

Notice of Allowance of the Japanese application No. 2018-532410, dated Sep. 4, 2020.

* cited by examiner

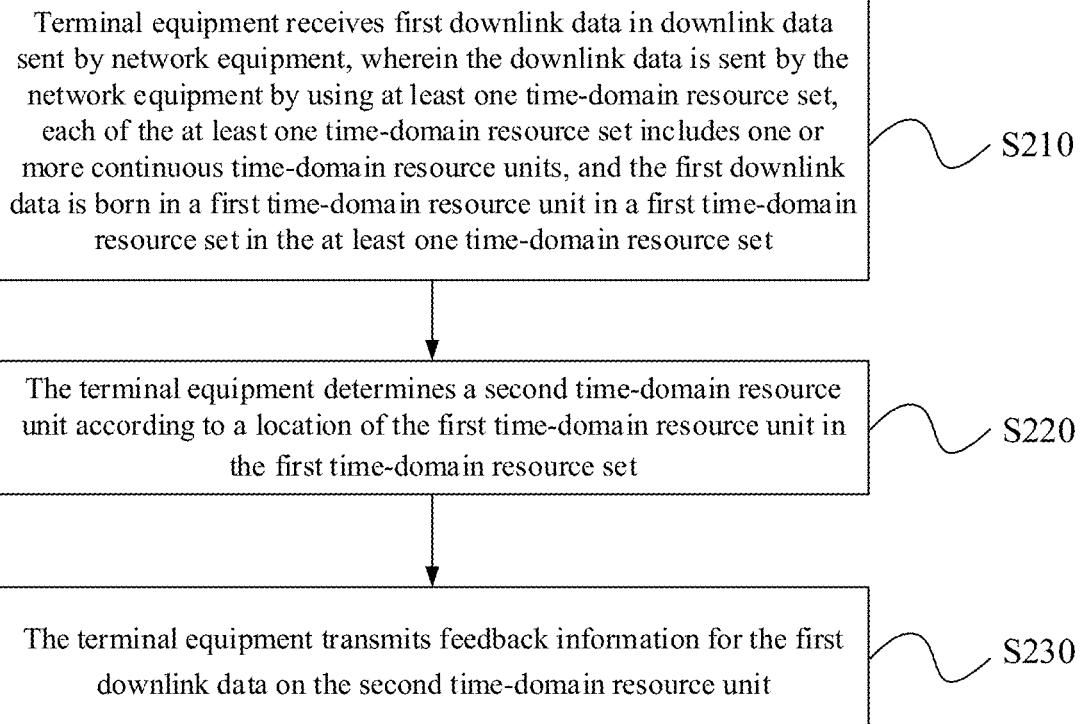
FIG. 2
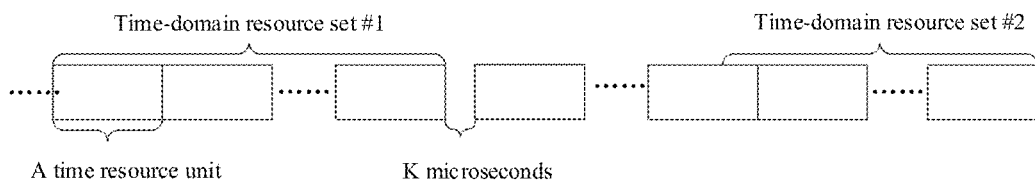
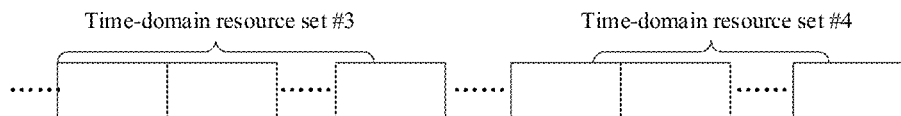
FIG. 3

300

| Network equipment transmits downlink data by using at least one time-domain resource set, each of the at least one time-domain resource set including one or more continuous time-domain resource units, the downlink data including first downlink data sent to terminal equipment and the first downlink data being born in a first time-domain resource unit in a first time-domain resource set in the at least one time-domain resource set | ～ S310 |

| The network equipment determines a second time-domain resource unit according to a location of the first time-domain resource unit in the first time-domain resource set | ～ S320 |

| The network equipment receives feedback information for the first downlink data on the second time-domain resource unit | ～ S330 |

FIG. 11

METHOD AND APPARATUS FOR TRANSMITTING FEEDBACK INFORMATION

CROSS REFERENCE TO RELATED APPLICATIONS

This application is a continuation of U.S. application Ser. No. 15/779,008 filed on May 24, 2018, which is the national phase under 35 U.S.C. § 371 of PCT International Application No. PCT/CN2016/077397, filed on Mar. 25, 2016, the entire content of which is hereby incorporated by reference.

BACKGROUND

At present, there is such a communication technology that terminal equipment may transmit feedback information to network equipment according to a receiving condition of downlink data after the network equipment (for example, a base station) transmits the downlink data to the terminal equipment. For example, if the downlink data is correctly received, for example, a decoding result is correct, the terminal equipment may feedback Acknowledgement (ACK) information (i.e., an example of the feedback information) to the base station. If the downlink data is wrongly received, for example, the decoding result is wrong, the terminal equipment may feedback Negative Acknowledgement (NACK) information (i.e., another example of the feedback information) to the base station.

However, in this communication technology, a time interval between transmission of the downlink data and transmission of the feedback information is a fixed value, that is, the terminal equipment may only transmit the feedback information on a specified time-domain resource, which seriously restricts transmission flexibility of the feedback information and influences transmission reliability of the feedback information.

SUMMARY

The disclosure relates to the field of communications, and more particularly to a method and apparatus for transmitting feedback information.

The disclosure provides a method and apparatus for transmitting feedback information, which may improve transmission flexibility and reliability of feedback information.

In a first aspect, a method for transmitting feedback information is provided. According to the method, terminal equipment receives first downlink data in downlink data sent by network equipment. The downlink data may be sent by the network equipment by using at least one time-domain resource set. Each of the at least one time-domain resource set may include one or more continuous time-domain resource units. The first downlink data may be born in a first time-domain resource unit in a first time-domain resource set in the at least one time-domain resource set. The terminal equipment determines a second time-domain resource unit according to a location of the first time-domain resource unit in the first time-domain resource set. The terminal equipment transmits feedback information for the first downlink data on the second time-domain resource unit.

According to the method for transmitting feedback information of embodiments of the disclosure, time-domain resources provided by a system are divided into multiple time-domain resource units. Each of the at least one time-domain resource set includes one or more continuous time-domain resource units. The network equipment transmits the first downlink data to the terminal equipment through the first time-domain resource unit in the first time-domain resource set. Moreover, the terminal equipment and the network equipment may determine the second time-domain resource unit based on the location of the first time-domain resource unit in the first time-domain resource set, and the feedback information may be transmitted on the second time-domain resource unit, so that the feedback information may be transmitted beyond a restriction of the system, and transmission flexibility and reliability of the feedback information may be improved.

In combination with the first aspect, in a first implementation mode of the first aspect, multiple continuous time-domain resource units comprised in each of the time-domain resource sets have the same time lengths; or at least two time-domain resource units in the multiple continuous time-domain resource units comprised in each of the time-domain resource sets have different time lengths.

In combination with the first aspect and the abovementioned implementation mode thereof, in a second implementation mode of the first aspect, the first time-domain resource set may include Q time-domain resource units, wherein Q $\geq$ T, wherein T may be a positive integer, a value of T may be determined according to a system processing delay, and the operation that the terminal equipment determines the second time-domain resource unit according to the location of the first time-domain resource unit in the first time-domain resource set may include that: if the first time-domain resource unit belongs to the first Q-T time-domain resource units in the first time-domain resource set on a time domain, the terminal equipment determines that the second time-domain resource unit is located after the first time-domain resource set and an interval between a starting location of the second time-domain resource unit and an ending location of the last time-domain resource unit in the first time-domain resource set is K microseconds, wherein K may be a preset value and K $\geq$ 0.

In combination with the first aspect and the abovementioned implementation modes thereof, in a third implementation mode of the first aspect, the first time-domain resource set may include Q time-domain resource units, wherein Q $\geq$ T, wherein T may be a positive integer, the value of T may be determined according to the system processing delay, and the operation that the terminal equipment determines the second time-domain resource unit according to the location of the first time-domain resource unit in the first time-domain resource set may include that: if the first time-domain resource unit belongs to the last T time-domain resource units in the first time-domain resource set on the time domain, the terminal equipment determines that the second time-domain resource unit is located after a second time-domain resource set and an interval between the starting location of the second time-domain resource unit and an ending location of the last time-domain resource unit in the second time-domain resource set is K microseconds, wherein K may be a preset value, K $\geq$ 0 and the second time-domain resource set may be a time-domain resource set located immediately after the first time-domain resource set on the time domain.

In combination with the first aspect and the abovementioned implementation modes thereof, in a fourth implementation mode of the first aspect, the operation that the terminal equipment receives the first downlink data in the downlink data sent by the network equipment may include that: the terminal equipment receives the first downlink data in the downlink data sent by the network equipment through an unlicensed carrier; and the operation that the terminal equipment transmits the feedback information for the first downlink data on the second time-domain resource unit may include that: the terminal equipment transmits the feedback information for the first downlink data on the second time-domain resource unit through the unlicensed carrier.

According to the method for transmitting feedback information of the embodiments of the disclosure, the second time-domain resource unit is located close to the time-domain resource set used when the network equipment transmits the downlink data, and particularly when the network equipment and the terminal equipment perform wireless communication by using an unlicensed resource, a probability that the second time-domain resource unit is occupied by other network equipment may be greatly reduced, so that the transmission reliability of the feedback information may further be improved.

In combination with the first aspect and the abovementioned implementation modes thereof, in a fifth implementation mode of the first aspect, the first time-domain resource set may include Q time-domain resource units, wherein $Q \geq T$, wherein T may be a positive integer, the value of T may be determined according to the system processing delay, and the operation that the terminal equipment transmits the feedback information for the first downlink data on the second time-domain resource unit may include that: the terminal equipment transmits C×L-bit feedback information to the network equipment in the second time-domain resource unit, the feedback information for the first downlink data belonging to the C×L-bit feedback information, wherein C may be a maximum feedback information amount corresponding to downlink data transmitted in a time-domain resource unit, L may be a positive integer and $L \geq Q$.

In combination with the first aspect and the abovementioned implementation modes thereof, in a sixth implementation mode of the first aspect, the operation that the terminal equipment transmits the feedback information for the first downlink data on the second time-domain resource unit may include that: the terminal equipment determines a first bit in the second time-domain resource unit according to the location of the first time-domain resource unit in the first time-domain resource set; and the terminal equipment bears the feedback information for the first downlink data in the first bit.

According to the method for transmitting feedback information of the embodiments of the disclosure, the same time-domain resource unit may transmit feedback information for multiple pieces of downlink data, and moreover, the terminal equipment and the network equipment determine the bit configured to bear the feedback information for the first downlink data in the second time-domain resource unit based on the location of the first time-domain resource unit in the first time-domain resource set, so that the feedback information may be transmitted in a centralized manner, and processing efficiency of a base station may be improved.

In combination with the first aspect and the abovementioned implementation modes thereof, in a seventh implementation mode of the first aspect, the method may further include that: the terminal equipment receives at least one piece of set indication information, the at least one time-domain resource set having one to one correspondence to the at least one piece of set indication information and each piece of set indication information being configured to indicate number information of the corresponding time-domain resource set.

According to the method for transmitting feedback information of the embodiments of the disclosure, the set indication information is transmitted between the network equipment and the terminal equipment, and then the terminal equipment may determine whether a detected time-domain resource set is consistent with the time-domain resource set used by the network equipment or not, so that the transmission reliability of the feedback information may further be improved.

In a second aspect, a method for transmitting feedback information is provided, which may include that: network equipment transmits downlink data by using at least one time-domain resource set, each of the at least one time-domain resource set including one or more continuous time-domain resource units, the downlink data including first downlink data sent to terminal equipment and the first downlink data being born in a first time-domain resource unit in a first time-domain resource set in the at least one time-domain resource set; the network equipment determines a second time-domain resource unit according to a location of the first time-domain resource unit in the first time-domain resource set; and the network equipment receives feedback information for the first downlink data on the second time-domain resource unit.

In combination with the second aspect, in a first implementation mode of the second aspect, multiple continuous time-domain resource units comprised in each of the time-domain resource sets have the same time lengths a time length of each time-domain resource unit in multiple continuous time-domain resource units comprised in each time-domain resource set is the same; or at least two time-domain resource units in the multiple continuous time-domain resource units comprised in each of the time-domain resource sets have different time lengths.

In combination with the second aspect and the above-mentioned implementation mode thereof, in a second implementation mode of the second aspect, the first time-domain resource set may include Q time-domain resource units, wherein $Q \geq T$, wherein T may be a positive integer, a value of T may be determined according to a system processing delay, and the operation that the network equipment determines the second time-domain resource unit according to the location of the first time-domain resource unit in the first time-domain resource set may include that: if the first time-domain resource unit belongs to the first Q-T time-domain resource units in the first time-domain resource set on a time domain, the network equipment determines that the second time-domain resource unit is located after the first time-domain resource set and an interval between a starting location of the second time-domain resource unit and an ending location of the last time-domain resource unit in the first time-domain resource set is K microseconds, wherein K may be a preset value and $K \geq 0$.

In combination with the second aspect and the above-mentioned implementation modes thereof, in a third implementation mode of the second aspect, the first time-domain resource set may include Q time-domain resource units, wherein $Q \geq T$, wherein T may be a positive integer, a value of T may be determined according to the system processing delay, and the operation that the network equipment determines the second time-domain resource unit according to the location of the first time-domain resource unit in the first time-domain resource set may include that: if the first time-domain resource unit belongs to the last T time-domain resource units in the first time-domain resource set on the time domain, the network equipment determines that the second time-domain resource unit is located after a second time-domain resource set and an interval between the starting location of the second time-domain resource unit and an ending location of the last time-domain resource unit in the second time-domain resource set is K microseconds, wherein K may be a preset value, $K \geq 0$ and the second time-domain resource set may be a time-domain resource set located immediately after the first time-domain resource set on the time domain.

In combination with the second aspect and the above-mentioned implementation modes thereof, in a fourth implementation mode of the second aspect, the first time-domain resource set may include Q time-domain resource units, wherein $Q \geq T$, wherein T may be a positive integer, a value of T may be determined according to the system processing delay, and the operation that the network equipment receives the feedback information for the first downlink data on the second time-domain resource unit may include that: the network equipment receives C×L-bit feedback information sent by the terminal equipment in the second time-domain resource unit, the feedback information for the first downlink data belonging to the C×L-bit feedback information, wherein C may be a maximum feedback information amount corresponding to downlink data transmitted in a time-domain resource unit, L may be a positive integer and $L \geq Q$.

In combination with the second aspect and the above-mentioned implementation modes thereof, in a fifth implementation mode of the second aspect, the operation that the network equipment receives the feedback information for the first downlink data on the second time-domain resource unit may include that: the network equipment determines a first bit in the second time-domain resource unit according to the location of the first time-domain resource unit in the first time-domain resource set; and the network equipment takes information born in the first bit as the feedback information for the first downlink data.

In combination with the second aspect and the implementation modes thereof, in a sixth implementation mode of the second aspect, the method may further include that: the network equipment transmits at least one piece of set indication information, the at least one time-domain resource set having one to one correspondence to the at least one piece of set indication information and each piece of set indication information being configured to indicate number information of the corresponding time-domain resource set.

In combination with the second aspect and the above-mentioned implementation modes thereof, in a seventh implementation mode of the second aspect, the operation that the network equipment transmits the downlink data by using the at least one time-domain resource set may include that: the network equipment transmits the downlink data by using the at least one time-domain resource set through an unlicensed carrier; and the operation that the network equipment receives the feedback information for the first downlink data on the second time-domain resource unit may include that: the network equipment receives the feedback information for the first downlink data on the second time-domain resource unit through the unlicensed carrier.

In a third aspect, an apparatus for transmitting feedback information is provided, which includes units configured to execute each step in the first aspect and each implementation mode of the first aspect.

In a fourth aspect, an apparatus for transmitting feedback information is provided, which includes units configured to execute each step in the second aspect and each implementation mode of the second aspect.

In a fifth aspect, an apparatus for transmitting feedback information is provided, which includes a memory and a processor, the memory being configured to store a computer program and the processor being configured to call and run the computer program in the memory to enable the apparatus to execute any method for transmitting feedback information in the first aspect and various implementation modes thereof.

In a sixth aspect, an apparatus for transmitting feedback information is provided, which includes a memory and a processor, the memory being configured to store a computer program and the processor being configured to call and run the computer program in the memory to enable the apparatus to execute any method for transmitting feedback information in the second aspect and various implementation modes thereof.

A seventh aspect provides a computer program product, which includes computer program codes, the computer program codes being run by a receiving unit, a processing unit and a transmission unit or a receiver, a processor and a transmitter of terminal equipment to enable the terminal equipment to execute any method for transmitting feedback information in the first aspect and various implementation modes thereof.

An eighth aspect provides a computer program product, which includes computer program codes, the computer program codes being run by a receiving unit, a processing unit and a transmission unit or a receiver, a processor and a transmitter of network equipment to enable the network equipment to execute any method for transmitting feedback information in the second aspect and various implementation modes thereof.

A ninth aspect provides a computer-readable storage medium, which stores a program, the program enabling User Equipment (UE) to execute any method for transmitting feedback information in the first aspect and various implementation modes thereof.

A tenth aspect provides a computer-readable storage medium, which stores a program, the program enabling network equipment to execute any method for transmitting feedback information in the second aspect and various implementation modes thereof.

BRIEF DESCRIPTION OF DRAWINGS

In order to describe the technical solutions of the embodiments of the disclosure more clearly, the drawings required to be used in the embodiments of the disclosure will be simply introduced below. Apparently, the drawings described below are only some embodiments of the disclosure. Other drawings may further be obtained by those of ordinary skilled in the art according to these drawings without creative work.

FIG. 2 is a schematic flowchart of an example of a method for transmitting feedback information according to an embodiment of the disclosure.

FIG. 3 is a schematic diagram of an example of a time-domain resource set.

FIG. 11 is a schematic flowchart of another example of a method for transmitting feedback information according to an embodiment of the disclosure.

DETAILED DESCRIPTION

Figure 1:
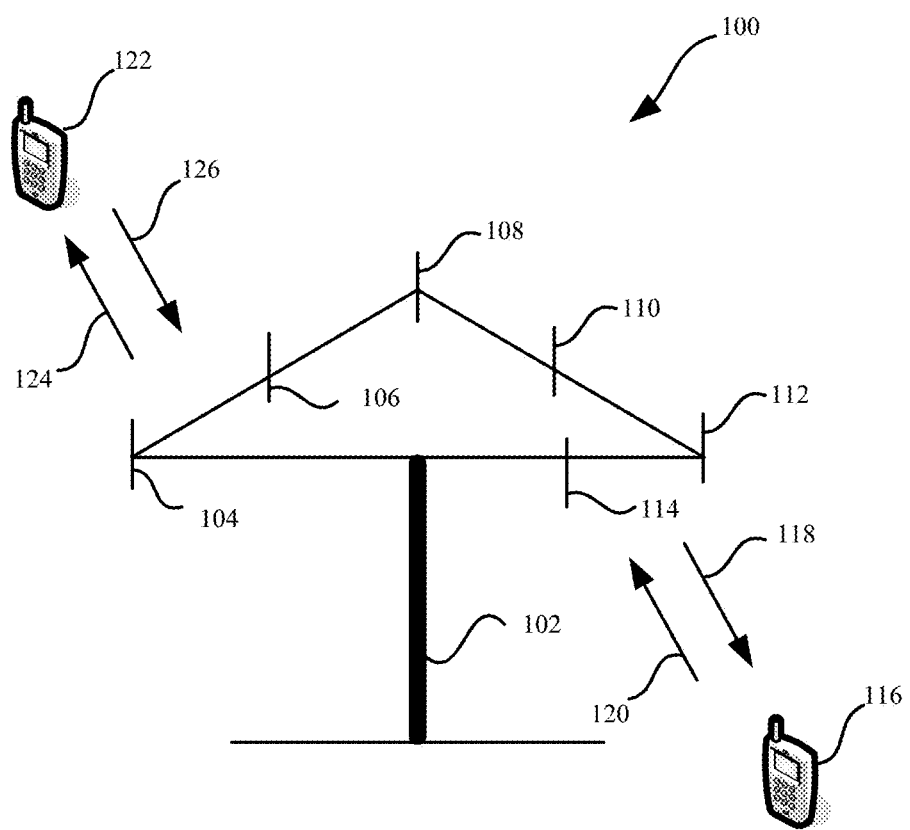
FIG. 1 is a schematic diagram of an example of a communication system to which a method for transmitting feedback information of an embodiment of the disclosure is applicable.

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art based on the embodiments in the disclosure without creative work shall fall within the scope of protection of the disclosure.

Terms "part", "module", "system" or the like used in the specification are adopted to represent a computer related entity, hardware, firmware, hardware and software combination, software or software in execution. For example, a part may be, but not limited to, a process running on a processor, the processor, an object, an executable file, an execution thread, a program and/or a computer. The drawings show that an application running on computing equipment and the computing equipment may both be parts. One or more parts may reside in a process and/or an execution thread, and the parts may be located on a computer and/or distributed between two or more computers. In addition, these parts may be executed from various computer-readable media with various data structures stored thereon. The parts may communicate through local and/or remote processes according to signals with one or more data groups (for example, data from two parts interacting with another part of a local system, a distributed system and/or a network, for example, the Internet interacting with another system through a signal).

The solutions of the embodiments of the disclosure may be applied to an existing cellular communication system, for example, a Global System for Mobile Communication (GSM), Wideband Code Division Multiple Access (WCDMA) and Long Term Evolution (LTE), and supported communication mainly includes voice and data communication. Connections supported by a conventional base station are usually limited in number and easy to implement.

A next-generation mobile communication system will not only support conventional communication but also support Machine to Machine (M2M) communication, or called as Machine Type Communication (MTC). It is predicted that, by 2020, MTC equipment connected to networks will reach 500 to 1,000 hundred million, which will be far larger than an existing connection number. M2M services have greatly different network requirements due to their greatly different service types. There may roughly be the following requirements:

reliable transmission but insensitivity to delays; and low delays and high-reliability transmission.

It is easier to process a reliable transmission delay-insensitive service. However, a service of a low-delay and highly-reliable transmission not only requires a short transmission delay but also requires reliability, for example, a Vehicle to Vehicle (V2V) service or a Vehicle to Everything (V2X) service. Unreliable transmission may cause retransmission and an excessively long transmission delay, which may not meet the requirements. Existence of a large number of connections makes a future wireless communication system greatly different from an existing communication system. The solutions according to the embodiments of the disclosure may effectively solve the transmission reliability problem.

Optionally, network equipment is a base station, and terminal equipment is UE.

Each embodiment of the disclosure is described in combination with the terminal equipment. The terminal equipment may also be called as UE, a mobile station, an access terminal, a user unit, a user station, a mobile radio station, a remote station, a remote terminal, mobile equipment, a user terminal, a terminal, wireless communication equipment, a user agent or a user device. The terminal equipment may be a station (ST) in a Wireless Local Area Network (WLAN), and may be a cell phone, a cordless phone, a Session Initiation Protocol (SIP) phone, a Wireless Local Loop (WLL) station, a Personal Digital Assistant (PDA), handheld equipment with a wireless communication function, computing equipment, other processing equipment connected to a wireless modem, vehicle-mounted equipment, wearable equipment, a mobile station in a future 5th-Generation (5G) network, terminal equipment in a future evolved Public Land Mobile Network (PLMN) or the like.

In addition, in the embodiments of the disclosure, the terminal equipment may further include other equipment capable of performing data communication with the network equipment (for example, a base station) such as a relay.

Each embodiment of the disclosure is described in combination with network equipment. The network equipment may be equipment configured to communicate with the mobile station, and the network equipment may be an Access Point (AP) in the WLAN, a Base Transceiver Station (BTS) in a Global System for Mobile Communication (GSM) or Code Division Multiple Access (CDMA), may also be aNodeB (NB) in WCDMA, and may further be an Evolutional Node B (eNB or eNodeB) in LTE, or a relay station or AP, or vehicle-mounted equipment, wearable equipment, network equipment in the future 5G network, network equipment in the future evolved PLMN or the like.

In addition, each aspect or characteristic of the disclosure may be implemented into a method, an apparatus or a product programmed with a standard and/or using an engineering technology. Term "product" used in the application covers a computer program which may be accessed from any computer-readable device, carrier or medium. For example, the computer-readable medium may include, but not limited to, a magnetic storage device (for example, a hard disk, a floppy disk or a magnetic tape), an optical disk (for example, a Compact Disk (CD), a Digital Versatile Disk (DVD)), a smart card and a flash memory (for example, an Erasable Programmable Read-Only Memory (EPROM), a card, a stick or a key driver). In addition, various storage media described in the disclosure may represent one or more pieces of equipment and/or other machine-readable media configured to store information. Term "machine-readable medium" may include, but not limited to, a wireless channel and various other media capable of storing, including and/or bearing instructions and/or data.

FIG. 1 is a schematic diagram of a control data transmission communication system according to the disclosure. As shown in FIG. 1, the communication system 100 includes network equipment 102, and the network equipment 102 may include multiple antennas, for example, antennas 104, 106, 108, 110, 112 and 114. In addition, the network equipment 102 may additionally include a transmitter chain and a receiver chain. Those of ordinary skilled in the art may know that all of them may include multiple parts (for example, a processor, a modulator, a multiplexer, a demodulator, a demultiplexer or an antenna) related to signal sending and receiving.

The network equipment 102 may communicate with multiple pieces of terminal equipment (for example, terminal equipment 116 and terminal equipment 122). However, it can be understood that the network equipment 102 may communicate with any amount of terminal equipment like the terminal equipment 116 or 122. The terminal equipment 116 and 122 may be, for example, cell phones, smart phones, portable computers, handheld communication equipment, handheld computing equipment, satellite radio devices, global positioning systems, PDAs and/or any other proper equipment configured for communication on the wireless communication system 100.

As shown in FIG. 1, the terminal equipment 116 communicates with the antennas 112 and 114, wherein the antennas 112 and 114 transmit information to the terminal equipment 116 through a forward link 118 and receive information from the terminal equipment 116 through a reverse link 120. In addition, the terminal equipment 122 communicates with the antennas 104 and 106, wherein the antennas 104 and 106 transmit information to the terminal equipment 122 through a forward link 124 and receive information from the terminal equipment 122 through a reverse link 126.

For example, in a Frequency Division Duplex (FDD) system, for example, the forward link 118 may use a frequency band different from that used by the reverse link 120, and the forward link 125 may use a frequency band different from that used by the reverse link 126.

For another example, in a Time Division Duplex (TDD) system and a full duplex system, the forward link 118 and the reverse link 120 may use the same frequency band, and the forward link 124 and the reverse link 126 may use the same frequency band.

Each antenna (or antenna group formed by multiple antennas) and/or region designed for communication are/is called as sectors/a sector of the network equipment 102. For example, the antenna group may be designed to communicate with terminal equipment in a sector of coverage area of the network equipment 102. In a process that the network equipment 102 communicates with the terminal equipment 116 and 122 through the forward links 118 and 124 respectively, a transmission antenna of the network equipment 102 may use beamforming to improve signal noise ratios of the forward links 118 and 124. In addition, compared with a manner that the network equipment transmits signals to all its terminal equipment through a single antenna, when the network equipment 102 transmits signals to the terminal equipment 116 and 122 randomly scattered in the related coverage area by using beamforming, mobile equipment in an adjacent cell may be interfered less.

In a given time, the network equipment 102, the terminal equipment 116 or the terminal equipment 122 may be a wireless communication transmitting device and/or a wireless communication receiving device. When data is sent, the wireless communication transmitting device may code the data for transmission. Specifically, the wireless communication transmitting device may acquire (for example, generation, receiving from another communication device or storage in a memory) a certain number of data bits to be sent to the wireless communication receiving device through a channel. The data bits may be included in a transmission block (or multiple transmission blocks) of the data, and the transmission block may be segmented to generate multiple code blocks.

In addition, the communication system 100 may be a PLMN or a Device-to-Device (D2D) network or an M2M network or a V2V network or a V2X network or another network. FIG. 1 is only a simplified schematic diagram listed as an example, and the network may further include other network equipment which is not shown in FIG. 1.

FIG. 2 shows a schematic flowchart of a method for transmitting feedback information 200 described in terms of terminal equipment according to an embodiment of the disclosure. As shown in FIG. 2, the method 200 includes the following steps.

In S210, terminal equipment receives first downlink data in downlink data sent by network equipment, wherein the downlink data is sent by the network equipment by using at least one time-domain resource set, each of the at least one time-domain resource set includes one or more continuous time-domain resource units, and the first downlink data is born in a first time-domain resource unit in a first time-domain resource set in the at least one time-domain resource set.

In S220, the terminal equipment determines a second time-domain resource unit according to a location of the first time-domain resource unit in the first time-domain resource set.

In S230, the terminal equipment transmits feedback information for the first downlink data on the second time-domain resource unit.

Frequency-domain resources and time-domain resources used in the method for transmitting feedback information 200 of the embodiment of the disclosure will be described below.

1. The Frequency-Domain Resources

In the embodiment of the disclosure, the terminal equipment and the network equipment may use an unlicensed spectrum resource for wireless communication.

Optionally, the operation that the terminal equipment receives the first downlink data in the downlink data sent by the network equipment includes that: the terminal equipment receives the first downlink data in the downlink data sent by the network equipment through an unlicensed carrier; and the operation that the terminal equipment transmits the feedback information for the first downlink data on the second time-domain resource unit includes that: the terminal equipment transmits the feedback information for the first downlink data on the second time-domain resource unit through the unlicensed carrier.

Moreover, optionally, the operation that the network equipment transmits the downlink data by using the at least one time-domain resource set includes that: the network equipment transmits the downlink data by using the at least one time-domain resource set through the unlicensed carrier; and the operation that the network equipment receives the feedback information for the first downlink data on the second time-domain resource unit includes that: the network equipment receives the feedback information for the first downlink data on the second time-domain resource unit through the unlicensed carrier.

Specifically, resource sharing on an unlicensed frequency band refers to that only restrictions in terms of indexes such as transmitted power and out-of-band leakage are specified for use of a specific spectrum to ensure that a basic coexistence requirement between multiple devices using the frequency band is met. An operating company may achieve a network capacity offloading purpose by using an unlicensed frequency band resource, but is required to follow regulatory requirements of different regions and different spectrums on unlicensed frequency band resources. These requirements are usually made to protect a public system such as a radar and ensure no harmful effects and fair coexistence between multiple systems as much as possible, and include a transmitted power restriction, an out-of-band leakage index, indoor and outdoor use restrictions and some additional coexistence strategies or the like in some regions. For example, each piece of communication equipment may use a spectrum resource by adopting a contention manner or a monitoring manner, for example, Listen Before Talk (LBT).

In a conventional art, feedback information is sent at a specified time (for example, 4 milliseconds) after terminal equipment receives downlink data, that is, the terminal equipment, after receiving the downlink data, decodes it and feeds back corresponding ACK/NACK information to a base station. The base station is required to know exactly about a transmission time of the ACK/NACK information. Moreover, in an existing LTE FDD system, a time interval between a time-domain resource bearing a Physical Downlink Shared Channel (PDSCH) of the downlink data and a time-domain resource bearing the feedback information of the downlink data is fixedly 4 ms.

In this case, if the terminal equipment transmits the feedback information at 4 ms after receiving the downlink data on an unlicensed carrier, it is very likely that the carrier has been preempted by another communication node (for example, network equipment except the network equipment transmitting the downlink data in a communication system). If the terminal equipment still transmits the feedback information on the time resource, serious interference may be brought to the other communication node on one hand, and on the other hand, its own detection performance may also be seriously influenced.

According to the method for transmitting feedback information of the embodiment of the disclosure, the second time-domain resource unit is located close to the time-domain resource set used when the network equipment transmits the downlink data, and particularly when the network equipment and the terminal equipment perform wireless communication by using an unlicensed resource, a probability that the second time-domain resource unit is occupied by other network equipment may be greatly reduced, so that transmission reliability of the feedback information may further be improved.

Exemplarily but unlimitedly, in the embodiment of the disclosure, the unlicensed spectrum resource may include an approximately 900 MHz frequency band in the vicinity of 5 GHz and an approximately 90 MHz frequency band in the vicinity of 2.4 GHz.

Correspondingly, the communication system 100 of the embodiment of the disclosure may be a communication system capable of using an unlicensed frequency band. Exemplarily but unlimitedly, the communication system 100 may adopt a Licensed-Assisted Access Using LTE (LAA-LTE) technology. For the latter condition, a technology supporting independent deployment of the communication system in an unlicensed frequency band, for example, Stand-alone LTE over unlicensed spectrum, may also be adopted, or, an LTE Advanced in Unlicensed Spectrums (LTE-U) technology may also be adopted. That is, the communication system 100 may independently deploy an LTE system on the unlicensed frequency band and further adopt an LTE air interface protocol to complete communication on the unlicensed frequency band, and the system does not include a licensed frequency band. The LTE system deployed on the unlicensed frequency band may utilize technologies of centralized scheduling, interference coordination, Hybrid Automatic Repeat reQuest (HARQ) or the like. Compared with access technologies of Wireless Fidelity (Wi-Fi) or the like, these technologies have higher robustness and may achieve higher spectrum efficiency and provide larger coverage and better user experiences.

In the embodiment of the disclosure, the communication system 100 may adopt, for example, Licensed-Assisted Access (LAA), Dual Connectivity (DC) and Standalone technologies. LAA includes utilization of a Carrier Aggregation (CA) configuration and structure in an existing LTE system for configuration of carriers (unlicensed carriers) on multiple unlicensed frequency bands based on configuration of carriers (licensed carriers) on a licensed frequency band of an operating company for communication and utilization of the unlicensed carriers for communication under assistance of the licensed carriers. That is, LTE equipment may adopt a CA manner to determine a licensed carrier as a Primary Component Carrier (PCC) or a Primary Cell (PCell) and determine an unlicensed carrier as a Secondary Component Carrier (SCC) or a Secondary Cell (SCell). The DC technology includes a technology of jointly using a licensed carrier and an unlicensed carrier in a non-CA (or, non-backhaul) manner, or, also includes a technology of jointly using multiple unlicensed carriers in the non-CA manner. LTE equipment may also be directly deployed on an unlicensed carrier in an independent deployment manner.

It should be understood that the frequency-domain resources, listed above, used by the terminal equipment and the network equipment are only exemplarily described and not intended to limit the disclosure. For example, in the embodiment of the disclosure, the terminal equipment and the network equipment may further use a licensed spectrum resource for wireless communication.

A licensed spectrum resource is usually a spectrum resource which is available only after approval of a national or regional wireless committee. Different systems, for example, an LTE system and a Wi-Fi system, or systems included in different operating companies are not allowed to share licensed spectrum resources.

2. The Time-Domain Resources

As shown in FIG. 3, in the embodiment of the disclosure, time-domain resources configured for the network equipment and the terminal equipment to transmit data and information may be divided into multiple time-domain resource units.

Moreover, in the embodiment of the disclosure, the multiple time-domain resource units may be continuous, and some adjacent time-domain resource units may also be spaced by a preset time interval. There are no special limits made in the disclosure.

Exemplarily but unlimitedly, in the embodiment of the disclosure, a length of a time-domain resource unit may be, for example, a length of a subframe in an LTE communication system, i.e., 1 millisecond, in the conventional art.

In addition, in the embodiment of the disclosure, one or more time-domain resource sets are used to transmit the downlink data between the network equipment and the terminal equipment.

The time-domain resource set in the embodiment of the disclosure will be described below in combination with FIG. 3 in detail.

In the embodiment of the disclosure, a time-domain resource set may include one or more time-domain resource units.

Moreover, when a time-domain resource set includes multiple time-domain resource units, the multiple time-domain resource units in the time-domain resource set may be continuous and may also be discontinuous (for example, some adjacent time-domain resource units are spaced by time intervals), which will not be specially limited in the disclosure.

Optionally, the multiple continuous time-domain resource units included in each time-domain resource set have the same time length as each other.

That is, in the embodiment of the disclosure, each time-domain resource unit in a time-domain resource set may be a complete time-domain resource unit.

For example, as shown in FIG. 3, each time-domain resource unit in a time-domain resource set #1 is a complete time-domain resource unit, that is, a time length of each time-domain resource unit in the time-domain resource set #1 is the same.

Alternatively, optionally, at least two time-domain resource units in the multiple continuous time-domain resource units included in each time-domain resource set have different time lengths from each other.

That is, in the embodiment of the disclosure, part of time-domain resource units in a time-domain resource set may be incomplete time-domain resource units.

For example, as shown in FIG. 3, a first time-domain resource unit in a time-domain resource set #2 is an incomplete time-domain resource unit; the last time-domain resource unit in a time-domain resource set #3 is an incomplete time-domain resource unit; and both the first time-domain resource unit and the last time-domain resource unit in a time-domain resource set #4 are incomplete time-domain resource units.

In addition, in the embodiment of the disclosure, adjacent time-domain resource sets may be spaced by time intervals. For example, the adjacent time-domain resource sets may be spaced by one or more time-domain resource units.

Moreover, in the embodiment of the disclosure, one time-domain resource set is configured to transmit data of only one piece of network equipment. For example, under the condition that a frequency-domain resource is an unlicensed frequency-domain resource, each piece of network equipment in the communication system may use a certain time-domain resource set in a contention manner.

In addition, in the embodiment of the disclosure, time-domain resource units in one time-domain resource set may be configured to transmit data of one piece of terminal equipment and may also be configured to transmit data of multiple pieces of terminal equipment, which is not specially limited in the disclosure. For example, multiple pieces of terminal equipment served by the same network equipment may receive data sent by the network equipment through time-domain resource units in a time-domain resource set in a manner of frequency division multiplexing, time division multiplexing or the like.

In the embodiment of the disclosure, each time-domain resource set may be pre-divided (or configured in a static or semi-static manner), that is, each time-domain resource set is divided and notified to each piece of network equipment by high-layer management equipment of the communication system, or, a division manner for each time-domain resource set may also be specified by a communication protocol, or the division manner for each time-domain resource set is prestored in each piece of network equipment in a manner of factory setting, setting by an administrator or the like.

Alternatively, in the embodiment of the disclosure, each time-domain resource set may also be autonomously determined by each piece of network equipment (or dynamically changed), that is, each piece of network equipment may determine available time-domain resource units in the contention manner and take one or more time-domain resource units obtained by contention as one or more time-domain resource sets. For example, the network equipment may configure multiple time-domain resource units obtained by contention in the same time-domain resource set.

In addition, in the embodiment of the disclosure, the amount of the time-domain resource units included in each time-domain resource set may be the same and may also be different, which is not specially limited in the disclosure.

A specific flow of the method 200 will be described below with a communication process between network equipment (referred as network equipment #A hereinafter for convenient understanding and distinction) in a communication system and terminal equipment (referred as terminal equipment #A hereinafter for convenient understanding and distinction) served by the network equipment #A as an example in detail, without loss of generality.

That is, in the method 200, the network equipment #A transmits downlink data (i.e., an example of first downlink data, referred as downlink data #A hereinafter for convenient understanding and distinction) to the terminal equipment #A, and the terminal equipment #A transmits feedback information (i.e., an example of feedback information for the first downlink data, referred as feedback information #A hereinafter for convenient understanding and distinction) for the downlink data #A to the network equipment #A.

In the embodiment of the disclosure, the network equipment #A may record a time-domain resource unit (referred as time-domain resource unit #A hereinafter for convenient understanding) where the downlink data #A is born when transmitting the downlink data #A. Moreover, the network equipment #A may record a time-domain resource set (referred as time-domain resource set #A hereinafter for convenient understanding and distinction) to which the time-domain resource unit #A belongs and a location of the time-domain resource unit #A in the time-domain resource set #A.

Moreover, in the embodiment of the disclosure, the terminal equipment #A may determine a time-domain resource bearing the downlink data #A based on a manner of scheduling of the network equipment #A, blind detection or the like, further determine the time-domain resource unit (i.e., the time-domain resource unit #A) corresponding to the time-domain resource bearing the downlink data #A and receive the downlink data #A on the time-domain resource unit #A.

Moreover, the terminal equipment may determine the feedback information #A (for example, ACK or NACK) according to a receiving condition of the downlink data #A.

In the embodiment of the disclosure, the terminal equipment #A may determine the time-domain resource set (i.e., the time-domain resource set #A) configured to transmit the downlink data #A and the location of the time-domain resource unit #A in the time-domain resource set #A in the following manner.

Optionally, the method further includes that:
the terminal equipment receives at least one piece of set indication information, the at least one time-domain resource set having one to one correspondence to the at least one piece of set indication information and each piece of set indication information being configured to indicate number information of the corresponding time-domain resource set.

Specifically, exemplarily but unlimitedly, in the embodiment of the disclosure, each time-domain resource set may have a number, and moreover, the numbers of every two adjacent time-domain resources are different from each other, or, a relationship between the numbers of the two adjacent time-domain resource sets corresponds to a location relationship between the two adjacent time-domain resource sets on a time domain.

Exemplarily but unlimitedly, in the embodiment of the disclosure, a serial number of a time-domain resource may be indicated by using, for example, information including two bits. For example, there is made such a hypothesis that there are, for example, 4 time-domain resource sets which are sequentially arranged on the time domain on the time domain: a time-domain resource set #1, a time-domain resource set #2, a time-domain resource set #3 and a time-domain resource set #4, wherein the time-domain resource set #1 is adjacent to the time-domain resource set #2, the time-domain resource set #2 is adjacent to the time-domain resource set #3, and the time-domain resource set #3 is adjacent to the time-domain resource set #4.

Then, in the embodiment of the disclosure, a serial number of the time-domain resource set #1 may be "00", a serial number of the time-domain resource set #2 may be "01", a serial number of the time-domain resource set #3 may be "10", and a serial number of the time-domain resource set #4 may be "11".

Therefore, the terminal equipment may distinguish each time-domain resource set according to the serial number of each time-domain resource, and moreover, may determine an arrangement sequence of each time-domain resource set according to the serial numbers of the time-domain resource sets.

It should be understood that an allocation manner, listed above, for the sequence numbers of the time-domain resource sets is only exemplarily described and not intended to limit the disclosure. For example, another amount of time-domain resource sets may also be used in the communication system, and under this condition, for example, the serial numbers may be reused. For example, "11" may be allocated to a time-domain resource set #0 adjacent to the time-domain resource set #1 and located before the time-domain resource set #1 on the time domain as a serial number. For another example, "00" may be allocated to a time-domain resource #5 adjacent to the time-domain resource set #4 and located before the time-domain resource set #4 on the time domain as a serial number. Alternatively, bits included in each serial number may also be freely set and are not specially limited in the disclosure.

In the embodiment of the disclosure, the network equipment #A may bear number information of the time-domain resource set #A in each time-domain resource unit of the time-domain resource set #A, so that the terminal equipment #A may determine the time-domain resource units containing the number information of the time-domain resource set #A as each time-domain resource unit in the time-domain resource set #A.

It should be understood that a specific parameter and transmission manner, listed above, used for the set indication information are only exemplarily described and not intended to limit the disclosure. For example, the network equipment #A may also contain the number information of the time-domain resource set #A in the time-domain resource unit arranged at a specified location (for example, the first) in the time-domain resource set #A, so that the terminal equipment may determine each time-domain resource unit in the time-domain resource set #A according to a location of the time-domain resource unit containing the number information of the time-domain resource set #A and the amount of the time-domain resource units included in the time-domain resource set #A.

It is noted that, in the embodiment of the disclosure, the amount of the time-domain resource units included in the time-domain resource set #A may be specified by the system and may also be indicated by the network equipment #A, which is not specially limited in the disclosure.

In such a manner, the terminal equipment #A may determine the time-domain resource set #A and each time-domain resource unit included in the time-domain resource set #A, so that the terminal equipment #A may determine the location of the time-domain resource unit #A in the time-domain resource set #A.

It should be understood that a manner, listed above, for the terminal equipment #A to determine the location of the time-domain resource unit #A in the time-domain resource set #A is only exemplarily described and not intended to limit the disclosure. For example, optionally, the method further includes that:

the terminal equipment determines a sequence number of the first time-domain resource unit, wherein a sequence number is configured to uniquely indicate a location of a time-domain resource unit in a time-domain resource set; and the terminal equipment determines the location of the first time-domain resource unit in the first time-domain resource set according to the sequence number of the first time-domain resource unit.

Specifically, in the embodiment of the disclosure, the time-domain resource units in each time-domain resource set may have sequence numbers (which may, for example, be added into the time-domain resource units by the network equipment #A or the high-layer equipment), wherein a sequence number is configured to uniquely indicate a time-domain resource unit in a time-domain resource set. For example, a sequence number of a time-domain resource unit may correspond to a location of the time-domain resource unit in the time-domain resource set where it belongs. Therefore, the terminal equipment #A may determine each time-domain resource unit in the time-domain resource set #A according to the sequence number of the time-domain resource unit #A and the amount of the time-domain resource units included in the time-domain resource set #A.

Optionally, the sequence number is a subframe number.

Specifically, in the embodiment of the disclosure, when subframes are used as time-domain resource units, subframe numbers may be used as sequence numbers of the time-domain resource units. That is, since each of subframe numbers corresponds to an arrangement sequence of each subframe on the time domain, the network equipment and the terminal equipment may determine a location of each subframe in a time-domain resource set according to the subframe number of each subframe (i.e., an example of the time-domain resource unit) in the same time-domain resource set.

It should be understood that a manner, listed above, for the network equipment #A and the terminal equipment #A to determine the time-domain resource set #A and the location of the time-domain resource unit #A in the time-domain resource set #A is only exemplarily described and not intended to limit the disclosure, and the abovementioned manner and process may be freely altered by those skilled in the art under the condition that the time-domain resource sets which are determined by the network equipment #A and the terminal equipment #A and to which the time-domain resource unit #A belongs may be ensured to be consistent and the locations, determined by the network equipment #A and the terminal equipment #A, of the time-domain resource unit #A in the time-domain resource set may be ensured to be consistent.

Communication equipment in a communication system usually has a processing delay (for example, a delay in an uplink and downlink transmission conversion process). For example, a processing delay in a present LTE system is 4 milliseconds, that is, an ending location of a downlink subframe and a starting location of an uplink subframe are required to be spaced by at least three subframes. In the embodiment of the disclosure, a specific location of a time-domain resource unit (i.e., an example of the second time-domain resource unit, referred as time-domain resource unit #B hereinafter for convenient understanding and distinction) configured to transmit the feedback information #A on the time domain is related to the processing delay.

That is, if the amount of the time-domain resource units included in the time-domain resource set #A is Q, there are the condition that $Q \geqslant T$ (i.e., the first condition) and the condition that $1 \geqslant Q < T$ (i.e., the second condition), wherein T is a positive integer, and a value of T is determined according to the processing delay. For example, if the processing delay is 4 milliseconds, $T \geqslant 3$.

A process of determining the time-domain resource unit #B will be described below for the first condition and the second condition in detail respectively.

The First Condition

Optionally, the first time-domain resource set includes Q time-domain resource units, wherein Q>T, wherein T is a positive integer, the value of T is determined according to the system processing delay, and the operation that the terminal equipment determines the second time-domain resource unit according to the location of the first time-domain resource unit in the first time-domain resource set includes that:

if the first time-domain resource unit belongs to the first Q-T time-domain resource units in the first time-domain resource set on the time domain, the terminal equipment determines that the second time-domain resource unit is located after the first time-domain resource set and an interval between a starting location of the second time-domain resource unit and an ending location of the last time-domain resource unit in the first time-domain resource set is K microseconds, wherein K is a preset value and $K \geqslant 0$.

Figure 4:
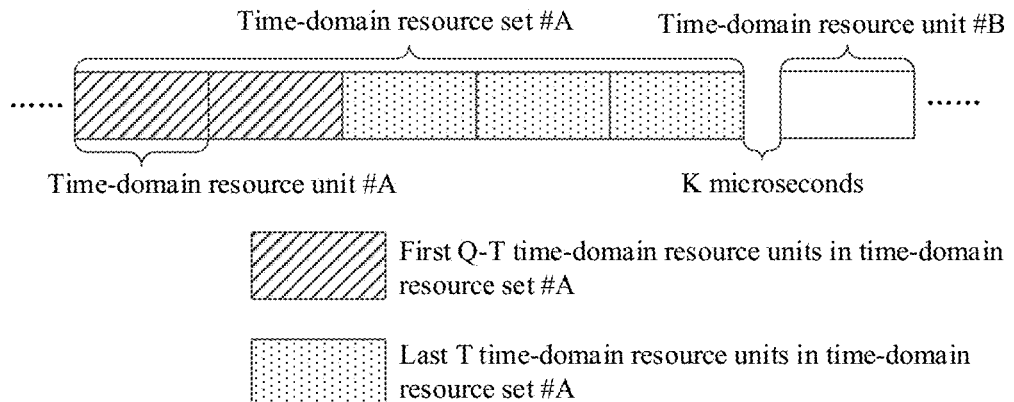
FIG. 4 is a schematic diagram of an example of determining a time-domain resource unit bearing feedback information.

Specifically, FIG. 4 is a schematic diagram of an example of determining a time-domain resource unit bearing feedback information. As shown in FIG. 4, when Q>T, if the time-domain resource unit #A belongs to the first Q-T time-domain resource units in the time-domain resource set #A, for example, when T=3, if the time-domain resource set #A includes 5 time-domain resource units (that is, Q=5) and, moreover, the time-domain resource unit #A belongs to the first two (namely, Q-T) time-domain resource units in the time-domain resource set #A, the terminal equipment #A and the network equipment #A may determine that the time-domain resource unit #B is located after the time-domain resource set #A (or an ending location of the last time-domain resource unit in the time-domain resource set #A), and moreover, the terminal equipment #A and the network equipment #A may determine that an interval between a starting location of the time-domain resource unit #B and the ending location of the last time-domain resource unit in the time-domain resource set #A is a preset value (i.e., K microseconds, $K \geqslant 0$).

It is noted that, in the embodiment of the disclosure, a specific value of K may be specified by the communication protocol and may also be set and notified to the terminal equipment #A by the network equipment #A, which is not specially limited in the disclosure. For example, the value of K may be 25. Moreover, making the interval between the starting location of the second time-domain resource unit and the ending location of the last time-domain resource unit in the first time-domain resource set at a microsecond level may make the time-domain resource configured to bear the feedback information close to the time-domain resource configured to bear the downlink data, so that a probability that the time-domain resource configured to bear the feedback information is preempted by other network equipment may be reduced, and the transmission reliability of the feedback information may further be improved.

In addition, in the embodiment of the disclosure, the terminal equipment #A and the network equipment #A may determine that the time-domain resource unit #A is located before a time-domain resource set #B (i.e., an example of a second time-domain resource set), wherein the time-domain resource set #B is the first time-domain resource set used by the network equipment #A to transmit the downlink data after the time-domain resource set #A.

According to the method for transmitting feedback information of the disclosure, when the first time-domain resource unit belongs to the first Q-T time-domain resource units in the first time-domain resource set on the time domain, the second time-domain resource unit is located after the first time-domain resource set, then a transmission opportunity of the feedback information may meet the uplink and downlink conversion processing delay of the network equipment and the terminal equipment, and moreover, the time-domain resource configured to bear the feedback information may be close to the time-domain resource configured to bear the downlink data, so that the transmission reliability of the feedback information may further be improved.

Optionally, the first time-domain resource set includes Q time-domain resource units, wherein $Q \geqslant T$, wherein T is a positive integer, the value of T is determined according to the system processing delay, and the operation that the terminal equipment determines the second time-domain resource unit according to the location of the first time-domain resource unit in the first time-domain resource set includes that:

if the first time-domain resource unit belongs to the last T time-domain resource units in the first time-domain resource set on the time domain, the terminal equipment determines that the second time-domain resource unit is located after a second time-domain resource set and an interval between the starting location of the second time-domain resource unit and an ending location of the last time-domain resource unit in the second time-domain resource set is A microseconds, wherein A is a preset value, $A \geqslant 0$ and the second time-domain resource set is a time-domain resource set located immediately after the first time-domain resource set on the time domain.

Figure 5:
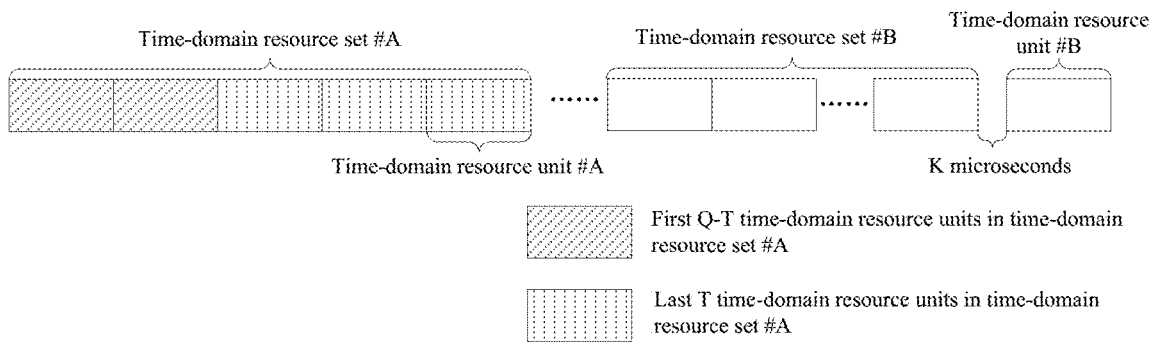
FIG. 5 is a schematic diagram of another example of determining a time-domain resource unit bearing feedback information.

Specifically, FIG. 5 is a schematic diagram of an example of determining a time-domain resource unit bearing feedback information. As shown in FIG. 5, when $Q \geqslant T$, if the time-domain resource unit #A belongs to the last T time-domain resource units in the time-domain resource set #A, for example, when T=3, if the time-domain resource set #A includes 5 time-domain resource units (that is, Q=5) and, moreover, the time-domain resource unit #A belongs to the last three (namely, T) time-domain resource units in the time-domain resource set #A, the terminal equipment #A and the network equipment #A may determine that the time-domain resource unit #B is located after the time-domain resource set #B (or an ending location of the last time-domain resource unit in the time-domain resource set #B), and moreover, the terminal equipment #A and the network equipment #A may determine that the interval between the starting location of the time-domain resource unit #B and the ending location of the last time-domain resource unit in the time-domain resource set #A is a preset value (i.e., K microseconds, $K \geqslant 0$).

Herein, the time-domain resource set #B (i.e., an example of the second time-domain resource set) is the first time-domain resource set used by the network equipment #A to transmit the downlink data after the time-domain resource set #A.

It is noted that, in the embodiment of the disclosure, the specific value of K may be specified by the communication protocol and may also be set and notified to the terminal equipment #A by the network equipment #A, which is not specially limited in the disclosure. Moreover, making the interval between the starting location of the second time-domain resource unit and the ending location of the last time-domain resource unit in the second time-domain resource set at the microsecond level may make the time-domain resource configured to bear the feedback information close to the time-domain resource configured to bear the downlink data, so that the probability that the time-domain resource configured to bear the feedback information is preempted by the other network equipment may be reduced, and the transmission reliability of the feedback information may further be improved.

According to the method for transmitting feedback information of the disclosure, when the first time-domain resource unit belongs to the last T time-domain resource units in the first time-domain resource set on the time domain, the second time-domain resource unit is located after the second time-domain resource set, then the transmission opportunity of the feedback information may meet the uplink and downlink conversion processing delay of the network equipment and the terminal equipment, and moreover, the time-domain resource configured to bear the feedback information may be close to the time-domain resource configured to bear the downlink data, so that the transmission reliability of the feedback information may further be improved.

The Second Condition

Optionally, the first time-domain resource set includes Q time-domain resource units, wherein Q<T, wherein T is a positive integer, the value of T is determined according to the system processing delay, and the operation that the terminal equipment determines the second time-domain resource unit according to the location of the first time-domain resource unit in the first time-domain resource set includes that:

the terminal equipment determines that the second time-domain resource unit is located after the second time-domain resource set and the interval between the starting location of the second time-domain resource unit and the ending location of the last time-domain resource unit in the second time-domain resource set is A microseconds, wherein A is a preset value, $A \geqslant 0$ and the second time-domain resource set is a time-domain resource set located immediately after the first time-domain resource set on the time domain.

Figure 6:
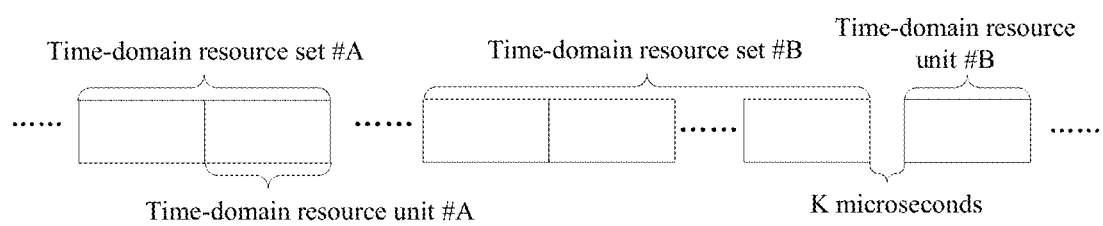
FIG. 6 is a schematic diagram of still another example of determining a time-domain resource unit bearing feedback information.

Specifically, FIG. 6 is a schematic diagram of determining a time-domain resource unit bearing feedback information. As shown in FIG. 6, when Q<T, for example, when T=3, if the time-domain resource set #A includes 2 time-domain resource units (that is, Q=2), the terminal equipment #A and the network equipment #A may determine that the time-domain resource unit #B is located after the time-domain resource set #B (or the ending location of the last time-domain resource unit in the time-domain resource set #B), and moreover, the terminal equipment #A and the network equipment #A may determine that the interval between the starting location of the time-domain resource unit #B and the ending location of the last time-domain resource unit in the time-domain resource set #A is a preset value (i.e., K microseconds, $K \geqslant 0$).

Herein, the time-domain resource set #B (i.e., an example of the second time-domain resource set) is the first time-domain resource set used by the network equipment #A to transmit the downlink data after the time-domain resource set #A.

It is noted that, in the embodiment of the disclosure, the specific value of K may be specified by the communication protocol and may also be set and notified to the terminal equipment #A by the network equipment #A, which is not specially limited in the disclosure. Moreover, making the interval between the starting location of the second time-domain resource unit and the ending location of the last time-domain resource unit in the second time-domain resource set at the microsecond level may make the time-domain resource configured to bear the feedback information close to the time-domain resource configured to bear the downlink data, so that the probability that the time-domain resource configured to bear the feedback information is preempted by the other network equipment may be reduced, and the transmission reliability of the feedback information may further be improved.

According to the method for transmitting feedback information of the disclosure, when the first time-domain resource unit belongs to the last T time-domain resource units in the first time-domain resource set on the time domain, the second time-domain resource unit is located after the second time-domain resource set, then the transmission opportunity of the feedback information may meet the uplink and downlink conversion processing delay of the network equipment and the terminal equipment, and moreover, the time-domain resource configured to bear the feedback information may be close to the time-domain resource configured to bear the downlink data, so that the transmission reliability of the feedback information may further be improved.

As mentioned above, after the time-domain resource unit #B is determined, the terminal equipment #A may bear the feedback information #A in the time-domain resource unit #B and transmit it to the network equipment #A, so that the network equipment #A may acquire the feedback information #A in the time-domain resource unit #B.

Exemplarily but unlimitedly, in the embodiment of the disclosure, the network equipment #A and the terminal equipment #A may transmit the feedback information #A through the time-domain resource unit B3 in the following manner.

For example, optionally, the first time-domain resource set includes Q time-domain resource units, wherein $Q \geq T$, wherein T is a positive integer, the value of T is determined according to the system processing delay, and the operation that the terminal equipment transmits the feedback information for the first downlink data on the second time-domain resource unit includes that:

the terminal equipment transmits C×L-bit feedback information to the network equipment in the second time-domain resource unit, the feedback information for the first downlink data belonging to the C×L-bit feedback information, wherein C is a maximum feedback information amount corresponding to downlink data transmitted in a time-domain resource unit, L is a positive integer and $L \geq Q$.

Specifically, in the embodiment of the disclosure, exemplarily but unlimitedly, a maximum number (i.e., an example of a value of L) of time-domain resource units which may be included in a time-domain resource set, or, a maximum amount (i.e., an example of the value of L) of feedback information which may be born by an (uplink) time-domain resource unit, may be specified in the embodiment of the disclosure.

Without loss of generality, for two adjacent time-domain resource sets (referred as time-domain resource set #C and time-domain resource set #D hereinafter for convenient understanding) on the time domain, wherein the time-domain resource set #D is located after the time-domain resource set #C on the time domain, a time-domain resource unit located after the time-domain resource set #D and at an interval of K microseconds with an ending location of the last time-domain resource unit in the time-domain resource set #D is referred as time-domain resource unit #D, that is, the time-domain resource unit #D is the first time-domain resource unit after the time-domain resource set #D.

Then, in an implementation mode of the disclosure, bits configured to bear L pieces of feedback information are configured in the time-domain resource unit #D, wherein the L pieces of feedback information include T pieces of feedback information #C, Q-T pieces of feedback information #D and L-Q NACKs, wherein the feedback information #C is feedback information for the downlink data born on the last T time-domain resource units in the time-domain resource set #C, and the feedback information #D is feedback information for the downlink data born on the first Q-T time-domain resource units in the time-domain resource set #D, wherein Q is the number of time-domain resource units included in the time-domain resource set #D.

In the embodiment of the disclosure, L may be a preset value specified by the system (for example, 10), that is, $L \geq Q$.

Or, since both the network equipment and the terminal equipment may learn about the number of the time-domain resource units included in each time-domain resource set, in the embodiment of the disclosure, L may be freely altered according to a practical application condition. For example, it may be specified that L=Q.

In the embodiment of the disclosure, it may be specified that C·L-bit feedback information may be transmitted in a time-domain resource unit, that is, each piece of feedback information may include C bits, C being the maximum feedback information amount corresponding to the downlink data transmitted in a time-domain resource unit.

Exemplarily but unlimitedly, for example, when a single-codeword transmission mode is configured, or a dual-codeword transmission mode is configured and an ACK/NACK space combining is used, C=1.

When the dual-code word transmission mode is configured and ACK/NACK space combining is not used, C=2.

In addition, in the embodiment of the disclosure, an arrangement sequence of the L pieces of feedback information on the time-domain resource unit #D may correspond to a sequence of a time-domain resource unit corresponding to each piece of feedback information on the time domain.

Figure 7:
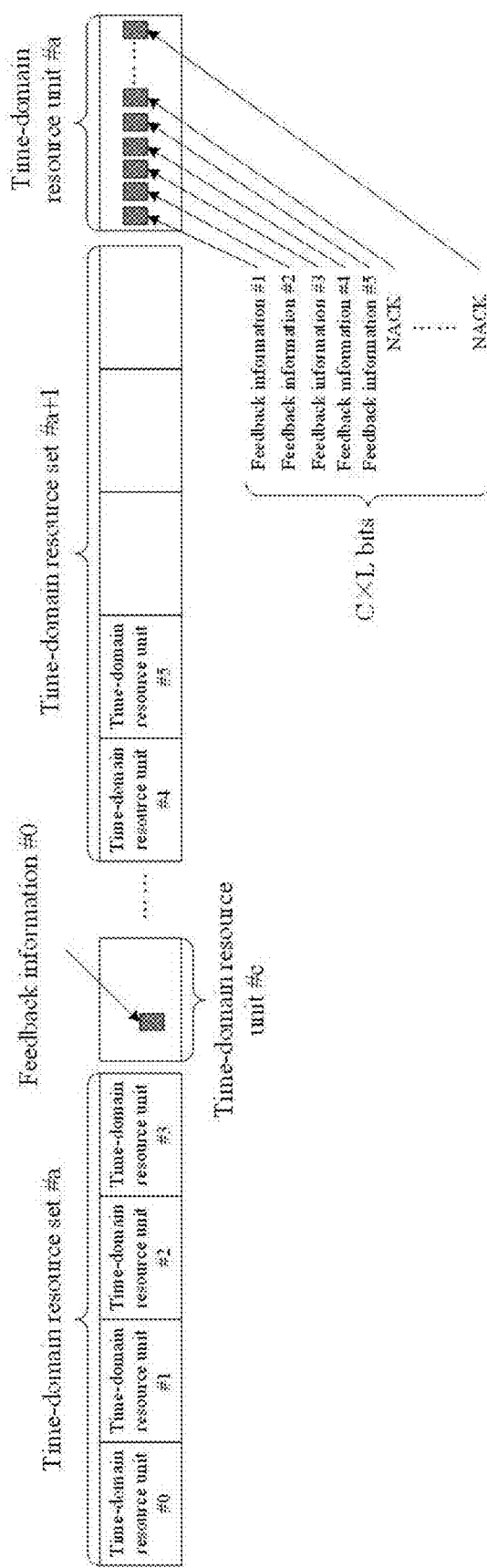
FIG. 7 is a schematic diagram of an example of a configuration manner for each bit in a time-domain resource unit.

Without loss of generality, it is set that two adjacent time-domain resource sets used by the network equipment #A are a time-domain resource set #a and a time-domain resource set #a+1, wherein the time-domain resource set #a is located before the time-domain resource set #a+1 on the time domain. It is set that T=3, the time-domain resource set #a includes 4 time-domain resource units, the time-domain resource set #+1 includes 5 time-domain resource units, and FIG. 7 shows a schematic diagram of an example of a configuration manner for each bit in a time-domain resource unit #a configured to feed back uplink information after a time-domain resource set #a+1.

As mentioned above, feedback information (i.e., feedback information #0 in FIG. 7) for the downlink data born on a time-domain resource unit #0 in the time-domain resource set #a is born in a time-domain resource unit #c located after the time-domain resource set #a.

Moreover, feedback information (i.e., feedback information #1-feedback information #3 in FIG. 7) for the downlink data born on a time-domain resource unit #1-time-domain resource unit #3 in the time-domain resource set #a and feedback information (i.e., feedback information #4-feedback information #5) for the downlink data born on a time-domain resource unit #4 and time-domain resource unit #5 in the time-domain resource set #a+1 are born in the time-domain resource unit #a located after the time-domain resource set #a+1.

Under this condition, C·L bits may be born on the time-domain resource unit #a, wherein the first bit-(C×1)th bit are configured to bear the feedback information #1, the (C×1+1)th bit-(C×2)th bit are configured to bear the feedback information #2, the (C×2+1)th bit-(C×3)th bit are configured to bear the feedback information #3, the (C×3+1)th bit-(C×4)th bit are configured to bear the feedback information #4, and the (C×4+1)th bit-(C×5)th bit are configured to bear the feedback information #5.

In addition, the other bits in the time-domain resource unit #a bear no feedback information, may be filled with NACK information and may also be kept in a vacant state, which is not specially limited in the disclosure.

It should be understood that the determination manner, listed above, for the bit corresponding to each piece of feedback information is only exemplarily described and not intended to limit the disclosure, as long as the network equipment and the terminal equipment transmit the feedback information for the same downlink data on the same bit.

For example, in the embodiment of the disclosure, when each time-domain resource set includes at least T time-domain resource units, it is set, without loss of generality, that a time-domain resource unit #α configured to transmit feedback information is located after a time-domain resource set #α and a time-domain resource set #β is located before the time-domain resource set #α, then the first C·T bits in the time-domain resource unit #α may be configured to transmit the feedback information, on the last T time-domain resource units in the time-domain resource set #β, for the downlink data, and the other bits from the C·(T+1)th bit in the time-domain resource unit #α are sequentially configured to transmit the feedback information, on the time-domain resource units located before the last T time-domain resource units in the time-domain resource set #α, for the downlink data.

It is noted that, since the location of the time-domain resource unit #B may be determined based on the time-domain resource set #B, under the condition that the terminal equipment #A detects each time-domain resource set based on the manner of, for example, blind detection, there may exist the condition that the network equipment #A uses a certain time-domain resource set (referred as third time-domain resource set hereinafter for convenient understanding and distinction), for example, the network equipment #A transmits the downlink data on the third time-domain resource set, but the terminal equipment #A does not detect the third time-domain resource set, and under this condition, the locations, determined by the network equipment #A and the terminal equipment #A, of the time-domain resource unit #B may be different. Therefore, the feedback information may be wrongly transmitted.

Figure 8:
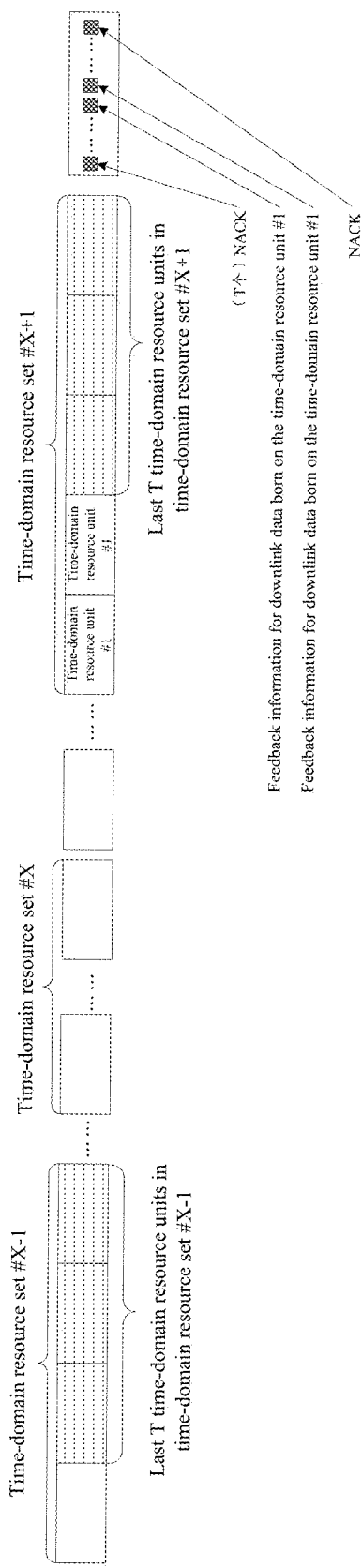
FIG. 8 is a schematic diagram of another example of a configuration manner for each bit in a time-domain resource unit.

For this condition, in the embodiment of the disclosure, the network equipment #A may add number information into each time-domain resource set used by it to indicate a serial number of each time-domain resource set used by the network equipment #A, and moreover, the serial number of each time-domain resource set corresponds to an arrangement sequence of each time-domain resource set on the time domain. For example, the serial numbers may be determined according to the arrangement sequence and a manner of sequentially and progressively increasing values by a specified value from small to large. For example, as shown in FIG. 8, it is set that three time-domain resource sets used by the network equipment #A are a time-domain resource set #X−1 (its serial number may be X−1), a time-domain resource set #X (its serial number may be X) and a time-domain resource set #X+1 (its serial number may be X+1), wherein the terminal equipment #A detects the time-domain resource set #X−1 and the time-domain resource set #X+1, but the terminal equipment #A does not detect the time-domain resource set #X.

Then, as mentioned above, in a determination process of the network equipment #A, feedback information (referred as feedback information #X−1 hereinafter for convenient understanding and distinction) for the downlink data born on the last T time-domain resource units in the time-domain resource set (i.e., the time-domain resource set #X−1) of which the serial number is X−1 should be born in a time-domain resource unit after the time-domain resource set (i.e., the time-domain resource set #X) of which the serial number is X.

However, since the terminal equipment #A does not detect the time-domain resource set #X, as mentioned above, in a determination process of the terminal equipment #A, the feedback information for the downlink data born on the last time-domain resource units in the time-domain resource set (i.e., the time-domain resource #X−1) of which the serial number is X−1 should be born in the first time-domain resource unit after the first time-domain resource set (i.e., the time-domain resource set #X+1) detected by the terminal equipment #A and located after the time-domain resource set #X.

Under this condition, the terminal equipment #A may acquire the serial number information from the time-domain resource set #X+1 and determine the serial number of the time-domain resource set #X+1 is X+1. Moreover, the terminal equipment #A may determine that the serial number of the last detected time-domain resource set (i.e., the time-domain resource set #X−1) is X−1.

Since the serial number of each time-domain resource set corresponds to the arrangement sequence of each time-domain resource set on the time domain, as mentioned above, the terminal equipment #A may determine that the time-domain resource set #X+1 is not the first time-domain resource set used by the network equipment #A after the time-domain resource set #X−1, and may forbid the feedback information #X−1 to be transmitted on the time-domain resource unit after the time-domain resource set #X+1.

Moreover, under this condition, the time-domain resource unit after the time-domain resource set #X+1 is only configured to transmit the feedback information for the downlink data born on the time-domain resource unit #1 and time-domain resource unit #2 in the time-domain resource set #X+1.

Moreover, since the terminal equipment #A does not detect the time-domain resource set #X, the first T bits on the time-domain resource unit after the time-domain resource set #X+1 are a NACK and represent that the terminal equipment #A does not accurately receive the downlink data born on the last T time-domain resource units in the time-domain resource set #X.

Figure 9:
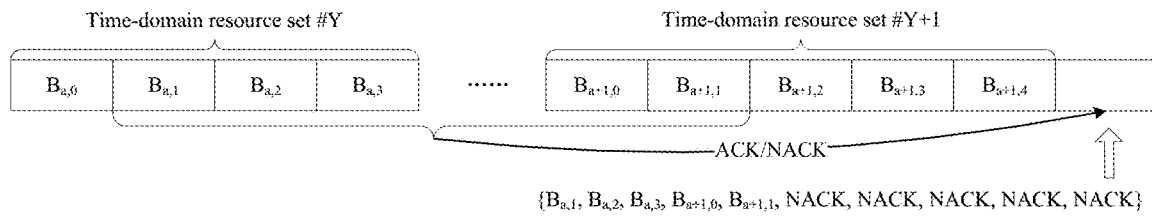
FIG. 9 is a schematic diagram of an example of a configuration manner for each bit in a time-domain resource unit.

FIG. 9 is a schematic diagram of an example of a configuration manner for each bit in a time-domain resource unit. As shown in FIG. 9, a time-domain resource set #Y includes 4 time-domain resource units, i.e., a time-domain resource unit #$B_{Y,0}$, a time-domain resource unit #$B_{Y,1}$, a time-domain resource unit #$B_{Y,2}$ and a time-domain resource unit #$B_{Y,3}$. Moreover, feedback information for downlink data born on the time-domain resource unit #$B_{Y,0}$ is referred as $B_{Y,0}$; feedback information for downlink data born on the time-domain resource unit #$B_{Y,1}$ is referred as $B_{Y,1}$; feedback information for downlink data born on the time-domain resource unit #$B_{Y,2}$ is referred as $B_{Y,2}$; and feedback information for downlink data born on the time-domain resource unit #$B_{Y,3}$ is referred as $B_{Y,3}$.

A time-domain resource set #Y+1 adjacent to the time-domain resource set #Y includes 5 time-domain resource units, i.e., a time-domain resource unit #$B_{Y+1,0}$, a time-domain resource unit #$B_{Y+1,1}$, a time-domain resource unit #$B_{Y+1,2}$, a time-domain resource unit #$B_{Y+1,3}$ and a time-domain resource unit #$B_{Y+1,4}$. Moreover, feedback information for downlink data born on the time-domain resource unit #$B_{Y+1,0}$ is referred as $B_{Y+1,0}$; feedback information for downlink data born on the time-domain resource unit #$B_{Y+1,1}$ is referred as $B_{Y+1,1}$; feedback information for downlink data born on the time-domain resource unit #$B_{Y+1,2}$ is referred as $B_{Y+1,2}$; feedback information for downlink data born on the time-domain resource unit #$B_{Y+1,3}$ is referred as $B_{Y+1,3}$; and feedback information for downlink data born on the time-domain resource unit #$B_{Y+1,4}$ is referred as $B_{Y+1,4}$.

Herein, the serial number of the time-domain resource set #Y is Y, and the serial number of the time-domain resource set #Y+1 is Y+1.

A time-domain resource unit located after the time-domain resource set #Y+1 and at an interval K with the time-domain resource set #Y+1 (or, the first after the time-domain resource set #Y+1) is referred as a time-domain resource unit #Z.

Then, when L=10 (that is, an amount of feedback information born in a time-domain resource unit is 10), C=1 and T=3, as shown in FIG. 9, the time-domain resource unit #Z includes 10 bits, and the first bit in the time-domain resource unit #Z is configured to bear $B_{Y,1}$; the second bit in the time-domain resource unit #Z is configured to bear $B_{Y,2}$; the third bit in the time-domain resource unit #Z is configured to bear $B_{Y,3}$; the fourth bit in the time-domain resource unit #Z is configured to bear $B_{Y+1,0}$; the fifth bit in the time-domain resource unit #Z is configured to bear $B_{Y+1,1}$; and the sixth bit-tenth bit in the time-domain resource unit #Z are configured to bear a NACK.

That is, in the embodiment of the disclosure, C×L-bit feedback information (i.e., ACK or NACK) is sent in the first time-domain resource unit after the time-domain resource set #X+1, wherein the first C×L bits of the information are feedback information corresponding to the downlink data born on the last T time-domain resource units in the time resource set #X.

In addition, in the embodiment of the disclosure, the C×L-bit feedback information is sent in the first time-domain resource unit after the time-domain resource set #X, wherein the first (C×T+1)th bit-(C×Q)th bit of the information are feedback information corresponding to the downlink data born on the first Q-T time-domain resource units in the time resource set #X.

Figure 10:
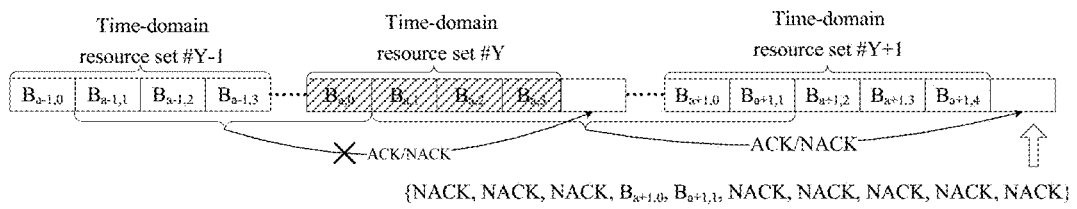
FIG. 10 is a schematic diagram of another example of a configuration manner for each bit in a time-domain resource unit.

FIG. 10 is schematic diagram of another example of a configuration manner for each bit in a time-domain resource unit. As shown in FIG. 10, a time-domain resource set #Y−1 includes 4 time-domain resource units, i.e., a time-domain resource unit #$B_{Y-1,0}$, a time-domain resource unit #$B_{Y-1,1}$, a time-domain resource unit #$B_{Y-1,2}$ and a time-domain resource unit #$B_{Y-1,3}$. Moreover, feedback information for downlink data born on the time-domain resource unit #$B_{Y-1,0}$ is referred as $B_{Y-1,0}$; feedback information for downlink data born on the time-domain resource unit #$B_{Y-1,1}$ is referred as $B_{Y-1,1}$; feedback information for downlink data born on the time-domain resource unit #$B_{Y-1,2}$ is referred as $B_{Y-1,2}$; and feedback information for downlink data born on the time-domain resource unit #$B_{Y-1,3}$ is referred as $B_{Y-1,3}$.

A time-domain resource set #Y adjacent to the time-domain resource set #Y−1 includes 4 time-domain resource units, i.e., a time-domain resource unit #$B_{Y,0}$, a time-domain resource unit #$B_{Y,1}$, a time-domain resource unit #$B_{Y,2}$ and a time-domain resource unit #$B_{Y,3}$. Moreover, feedback information for downlink data born on the time-domain resource unit #$B_{Y,0}$ is referred as $B_{Y,0}$; feedback information for downlink data born on the time-domain resource unit #$B_{Y,1}$ is referred as $B_{Y,1}$; feedback information for downlink data born on the time-domain resource unit #$B_{Y,2}$ is referred as $B_{Y,2}$; and feedback information for downlink data born on the time-domain resource unit #$B_{Y,3}$ is referred as $B_{Y,3}$.

A time-domain resource set #Y+1 adjacent to the time-domain resource set #Y includes 5 time-domain resource units, i.e., a time-domain resource unit #$B_{Y+1,0}$, a time-domain resource unit #$B_{Y+1,1}$, a time-domain resource unit #$B_{Y+1,2}$, a time-domain resource unit #$B_{Y+1,3}$ and a time-domain resource unit #$B_{Y+1,4}$. Moreover, feedback information for downlink data born on the time-domain resource unit #$B_{Y+1,0}$ is referred as $B_{Y+1,0}$; feedback information for downlink data born on the time-domain resource unit #$B_{Y+1,1}$ is referred as $B_{Y+1,1}$; feedback information for downlink data born on the time-domain resource unit #$B_{Y+1,2}$ is referred as $B_{Y+1,2}$; feedback information for downlink data born on the time-domain resource unit #$B_{Y+1,3}$ is referred as $B_{Y+1,3}$; and feedback information for downlink data born on the time-domain resource unit #$B_{Y+1,4}$ is referred as $B_{Y+1,4}$.

A time-domain resource unit located after the time-domain resource set #Y+1 and at an interval K with the time-domain resource set #Y+1 (or, the first after the time-domain resource set #Y+1) is referred as a time-domain resource unit #Z.

Herein, the serial number of the time-domain resource set #Y−1 is Y−1, the serial number of the time-domain resource set #Y is Y, and the serial number of the time-domain resource set #Y+1 is Y+1.

Then, when L=10 (that is, an amount of feedback information born in a time-domain resource unit is 10), C=1 and T=3, as shown in FIG. 10.

When the terminal equipment does not detect the time-domain resource set #Y, or, the first time-domain resource set detected by the terminal equipment and located after the time-domain resource set #Y−1 is the time-domain resource set #Y+1, since a relationship between the serial number (i.e., Y+1) of the time-domain resource set #Y+1 and the serial number (i.e., Y) of the time-domain resource set #Y is inconsistent with a time-domain arrangement sequence of the time-domain resource set #Y+1 and the time-domain resource set #Y, the terminal equipment may determine that the time-domain resource set of which the serial number is Y (i.e., the time-domain resource set #Y) is not detected, and the terminal equipment may further determine that $B_{Y-1,1}$, $B_{Y-1,2}$ and $B_{Y-1,3}$ are all born in the time-domain resource unit #Z.

Moreover, since T=3, that is, the terminal equipment may determine that the detected time-domain resource set #Y includes at least three pieces of downlink data requiring feedback in the time-domain resource unit #Z (i.e., the downlink data born on the time-domain resource unit #$B_{Y,1}$, the time-domain resource unit #$B_{Y,2}$ and the time-domain resource unit #$B_{Y,3}$), and moreover, since the terminal equipment does not receive the downlink data, $B_{Y,1}$~$B_{Y,3}$ are NACKs.

As shown in FIG. 9, the time-domain resource unit #Z includes 10 bits, and the first bit in the time-domain resource unit #Z is configured to bear $B_{Y,1}$ (i.e., the NACK); the second bit in the time-domain resource unit #Z is configured to bear $B_{Y,2}$ (i.e., the NACK); the third bit in the time-domain resource unit #Z is configured to bear $B_{Y,3}$ (i.e., the NACK); the fourth bit in the time-domain resource unit #Z is configured to bear $B_{Y+1,0}$; the fifth bit in the time-domain resource unit #Z is configured to bear $B_{Y+1,1}$; and the sixth bit-tenth bit in the time-domain resource unit #Z are configured to bear a NACK.

In addition, in the embodiment of the disclosure, for example, when L=4, a maximum downlink HARQ process number supported in the system may be, for example, 10.

For another example, in the embodiment of the disclosure, when L=1–0, the maximum HARQ process number supported in the system may be, for example, 16.

According to the method for transmitting feedback information of the embodiment of the disclosure, the time-domain resources provided by the system are divided into multiple time-domain resource units, each time-domain resource set in the at least one time-domain resource set includes one or more continuous time-domain resource units, the network equipment transmits the first downlink data to the terminal equipment through the first time-domain resource unit in the first time-domain resource set, moreover, the terminal equipment and the network equipment may determine the second time-domain resource unit based on the location of the first time-domain resource unit in the first time-domain resource set, and the feedback information may be transmitted on the second time-domain resource unit, so that the feedback information may be transmitted beyond a restriction of the system, and the transmission flexibility and reliability of the feedback information may be improved.

FIG. 11 shows a schematic flowchart of a method for transmitting feedback information 300 described in terms of network equipment according to an embodiment of the disclosure. As shown in FIG. 11, the method 300 includes the following steps.

In S310, network equipment transmits downlink data by using at least one time-domain resource set, each of the at least one time-domain resource set including one or more continuous time-domain resource units, the downlink data including first downlink data sent to terminal equipment and the first downlink data being born in a first time-domain resource unit in a first time-domain resource set in the at least one time-domain resource set.

In S320, the network equipment determines a second time-domain resource unit according to a location of the first time-domain resource unit in the first time-domain resource set.

In S330, the network equipment receives feedback information for the first downlink data on the second time-domain resource unit.

Optionally, a time length of each time-domain resource unit in multiple continuous time-domain resource units included in each time-domain resource set is the same; or the time lengths of at least two time-domain resource units in the multiple continuous time-domain resource units included in each time-domain resource set are different.

Optionally, the first time-domain resource set includes Q time-domain resource units, wherein $Q \geq T$, wherein T is a positive integer, a value of T is determined according to a system processing delay, and the operation that the network equipment determines the second time-domain resource unit according to the location of the first time-domain resource unit in the first time-domain resource set includes that:

if the first time-domain resource unit belongs to the first Q-T time-domain resource units in the first time-domain resource set on a time domain, the network equipment determines that the second time-domain resource unit is located after the first time-domain resource set and an interval between a starting location of the second time-domain resource unit and an ending location of the last time-domain resource unit in the first time-domain resource set is A microseconds, wherein A is a preset value and $A \geq 0$.

Optionally, the first time-domain resource set includes Q time-domain resource units, wherein $Q \geq T$, wherein T is a positive integer, a value of T is determined according to the system processing delay, and the operation that the network equipment determines the second time-domain resource unit according to the location of the first time-domain resource unit in the first time-domain resource set includes that:

if the first time-domain resource unit belongs to the last T time-domain resource units in the first time-domain resource set on the time domain, the network equipment determines that the second time-domain resource unit is located after a second time-domain resource set and an interval between the starting location of the second time-domain resource unit and an ending location of the last time-domain resource unit in the second time-domain resource set is A microseconds, wherein A is a preset value, $K \geq 0$ and the second time-domain resource set is the first time-domain resource set located after the first time-domain resource set on the time domain.

Optionally, the first time-domain resource set includes Q time-domain resource units, wherein $Q \geq T$, wherein T is a positive integer, a value of T is determined according to the system processing delay, and the operation that the network equipment receives the feedback information for the first downlink data on the second time-domain resource unit includes that:

the network equipment receives C×L-bit feedback information sent by the terminal equipment in the second time-domain resource unit, the feedback information for the first downlink data belonging to the C×L-bit feedback information, wherein C is a maximum feedback information amount corresponding to downlink data transmitted in a time-domain resource unit, L is a positive integer and $L \geq Q$.

Optionally, the operation that the network equipment receives the feedback information for the first downlink data on the second time-domain resource unit includes that:

the network equipment determines a first bit in the second time-domain resource unit according to the location of the first time-domain resource unit in the first time-domain resource set; and the network equipment determines information born in the first bit as the feedback information for the first downlink data.

Optionally, the method further includes that:

the network equipment transmits at least one piece of set indication information, the at least one time-domain resource set corresponding to the at least one piece of set indication information one to one and each piece of set indication information being configured to indicate number information of the corresponding time-domain resource set.

The operations of the network equipment in the method 300 are similar to the operations of the network equipment in the method 200, and moreover, the operations of the terminal equipment in the method 300 are similar to the operations of the terminal equipment in the method 200. For avoiding elaborations, detailed descriptions are saved herein.

According to the method for transmitting feedback information of the embodiment of the disclosure, time-domain resources provided by a system are divided into multiple time-domain resource units, each of the at least one time-domain resource set includes one or more continuous time-domain resource units, the network equipment transmits the first downlink data to the terminal equipment through the first time-domain resource unit in the first time-domain resource set, moreover, the terminal equipment and the network equipment may determine the second time-domain resource unit based on the location of the first time-domain resource unit in the first time-domain resource set, and the feedback information may be transmitted on the second time-domain resource unit, so that the feedback information may be transmitted beyond a restriction of the system, and transmission flexibility and reliability of the feedback information may be improved.

The method for transmitting feedback information according to the embodiments of the disclosure is described above in combination with FIG. 1 to FIG. 11 in detail, and an apparatus for transmitting feedback information according to the embodiments of the disclosure will be described below in combination with FIG. 12 and FIG. 13 in detail.

Figure 12:
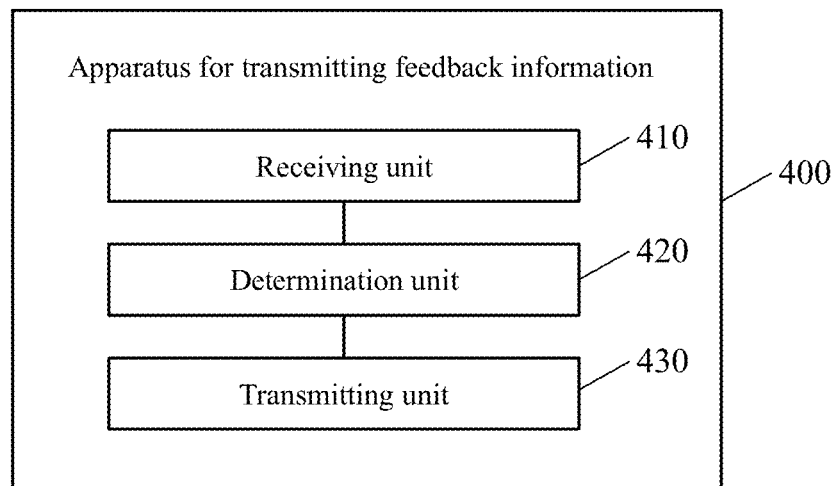
FIG. 12 is a schematic block diagram of an example of an apparatus for transmitting feedback information according to an embodiment of the disclosure.

FIG. 12 is a schematic block diagram of an apparatus for transmitting feedback information 400 according to an embodiment of the disclosure. As shown in FIG. 12, the apparatus 400 includes:

a receiving unit 410, configured to receive first downlink data in downlink data sent by network equipment, wherein the downlink data is sent by the network equipment by using at least one time-domain resource set, each of the at least one time-domain resource set includes one or more continuous time-domain resource units, and the first downlink data is born in a first time-domain resource unit in a first time-domain resource set in the at least one time-domain resource set;

a determination unit 420, configured to determine a second time-domain resource unit according to a location of the first time-domain resource unit in the first time-domain resource set; and a transmission unit 430, configured to transmit feedback information for the first downlink data on the second time-domain resource unit.

Optionally, a time length of each time-domain resource unit in multiple continuous time-domain resource units included in each time-domain resource set is the same; or the time lengths of at least two time-domain resource units in the multiple continuous time-domain resource units included in each time-domain resource set are different.

Optionally, the first time-domain resource set includes Q time-domain resource units, wherein $Q \geq T$, wherein T is a positive integer, a value of T is determined according to a system processing delay, and the determination unit is specifically configured to, if the first time-domain resource unit belongs to the first Q-T time-domain resource units in the first time-domain resource set on a time domain, determine that the second time-domain resource unit is located after the first time-domain resource set and an interval between a starting location of the second time-domain resource unit and an ending location of the last time-domain resource unit in the first time-domain resource set is A microseconds, wherein A is a preset value and $A \geq 0$.

Optionally, the first time-domain resource set includes Q time-domain resource units, wherein $Q \geq T$, wherein T is a positive integer, the value of T is determined according to the system processing delay, and the determination unit is specifically configured to, if the first time-domain resource unit belongs to the last T time-domain resource units in the first time-domain resource set on the time domain, determine that the second time-domain resource unit is located after a second time-domain resource set and an interval between the starting location of the second time-domain resource unit and an ending location of the last time-domain resource unit in the second time-domain resource set is A microseconds, wherein A is a preset value, $A \geq 0$ and the second time-domain resource set is the first time-domain resource set located after the first time-domain resource set on the time domain.

Optionally, the first time-domain resource set includes Q time-domain resource units, wherein $Q \geq T$, wherein T is a positive integer, the value of T is determined according to the system processing delay, and the transmission unit is specifically configured to transmit C×L-bit feedback information to the network equipment in the second time-domain resource unit, the feedback information for the first downlink data belonging to the C×L-bit feedback information, wherein C is a maximum feedback information amount corresponding to downlink data transmitted in a time-domain resource unit, L is a positive integer and $L \geq Q$.

Optionally, the determination unit is further configured to determine a first bit in the second time-domain resource unit according to the location of the first time-domain resource unit in the first time-domain resource set; and the transmission unit is specifically configured to bear the feedback information for the first downlink data in the first bit.

Optionally, the receiving unit is further configured to receive at least one piece of set indication information, the at least one time-domain resource set corresponding to the at least one piece of set indication information one to one and each piece of set indication information being configured to indicate number information of the corresponding time-domain resource set.

The apparatus for transmitting feedback information 400 according to the embodiment of the disclosure may correspond to terminal equipment in the method according to the embodiments of the disclosure, and moreover, each unit, i.e., module, and abovementioned operations and/or functions in the apparatus for transmitting feedback information 400 are adopted to implement the corresponding flows of the method 200 in FIG. 2 and will not be elaborated herein for simplicity.

According to the apparatus for transmitting feedback information of the embodiment of the disclosure, time-domain resources provided by a system are divided into multiple time-domain resource units, each time-domain resource set in the at least one time-domain resource set includes one or more continuous time-domain resource units, network equipment transmits the first downlink data to the terminal equipment through the first time-domain resource unit in the first time-domain resource set, moreover, terminal equipment and the network equipment may determine the second time-domain resource unit based on the location of the first time-domain resource unit in the first time-domain resource set, and the feedback information may be transmitted on the second time-domain resource unit, so that the feedback information may be transmitted beyond a restriction of the system, and transmission flexibility and reliability of the feedback information may be improved.

Figure 13:
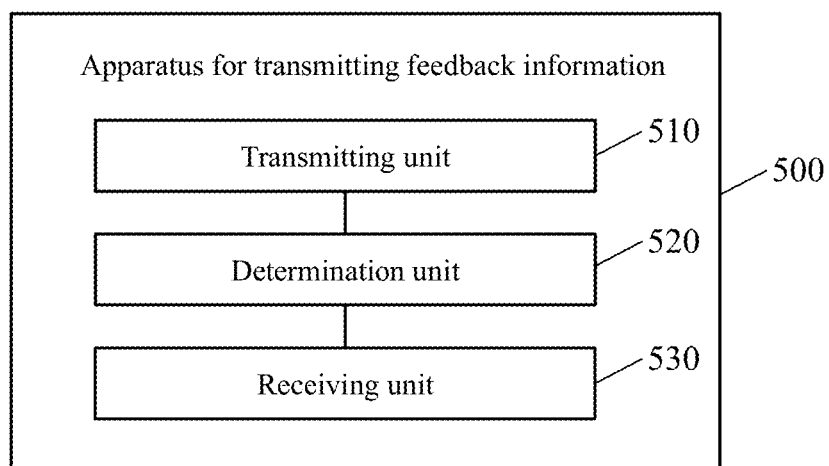
FIG. 13 is a schematic block diagram of another example of an apparatus for transmitting feedback information according to an embodiment of the disclosure.

FIG. 13 is a schematic block diagram of another example of an apparatus for transmitting feedback information 500 according to an embodiment of the disclosure. As shown in FIG. 13, the apparatus 500 includes:

a transmission unit 510, configured to transmit downlink data by using at least one time-domain resource set, each time-domain resource set in the at least one time-domain resource set including one or more continuous time-domain resource units, the downlink data including first downlink data sent to terminal equipment and the first downlink data being born in a first time-domain resource unit in a first time-domain resource set in the at least one time-domain resource set;

a determination unit 520, configured to determine a second time-domain resource unit according to a location of the first time-domain resource unit in the first time-domain resource set; and a receiving unit 530, configured to receive feedback information for the first downlink data on the second time-domain resource unit.

Optionally, a time length of each time-domain resource unit in multiple continuous time-domain resource units included in each time-domain resource set is the same; or the time lengths of at least two time-domain resource units in the multiple continuous time-domain resource units included in each time-domain resource set are different.

Optionally, the first time-domain resource set includes Q time-domain resource units, wherein $Q \geq T$, wherein T is a positive integer, a value of T is determined according to a system processing delay, and the determination unit is specifically configured to, if the first time-domain resource unit belongs to the first Q-T time-domain resource units in the first time-domain resource set on a time domain, determine that the second time-domain resource unit is located after the first time-domain resource set and an interval between a starting location of the second time-domain resource unit and an ending location of the last time-domain resource unit in the first time-domain resource set is A microseconds, wherein A is a preset value and $A \geq 0$.

Optionally, the first time-domain resource set includes Q time-domain resource units, wherein $Q \geq T$, wherein T is a positive integer, a value of T is determined according to the system processing delay, and the determination unit is specifically configured to, if the first time-domain resource unit belongs to the last T time-domain resource units in the first time-domain resource set on the time domain, determine that the second time-domain resource unit is located after a second time-domain resource set and an interval between the starting location of the second time-domain resource unit and an ending location of the last time-domain resource unit in the second time-domain resource set is A microseconds, wherein A is a preset value, $A \geq 0$ and the second time-domain resource set is the first time-domain resource set located after the first time-domain resource set on the time domain.

Optionally, the first time-domain resource set includes Q time-domain resource units, wherein $Q \geq T$, wherein T is a positive integer, a value of T is determined according to the system processing delay, and the receiving unit is specifically configured to receive C×L-bit feedback information sent by the terminal equipment in the second time-domain resource unit, the feedback information for the first downlink data belonging to the C×L-bit feedback information, wherein C is a maximum feedback information amount corresponding to downlink data transmitted in a time-domain resource unit, L is a positive integer and $L \geq Q$.

Optionally, the determination unit is further configured to determine a first bit in the second time-domain resource unit according to the location of the first time-domain resource unit in the first time-domain resource set and determine information born in the first bit as the feedback information for the first downlink data.

Optionally, the transmission unit is further configured to transmit at least one piece of set indication information, the at least one time-domain resource set corresponding to the at least one piece of set indication information one to one and each piece of set indication information being configured to indicate number information of the corresponding time-domain resource set.

The apparatus for transmitting feedback information 500 according to the embodiment of the disclosure may correspond to network equipment in the method according to the embodiments of the disclosure, and moreover, each unit, i.e., module, and abovementioned operations and/or functions in the apparatus for transmitting feedback information 500 are adopted to implement the corresponding flows of the method 300 in FIG. 11 and will not be elaborated herein for simplicity.

According to the apparatus for transmitting feedback information of the embodiment of the disclosure, time-domain resources provided by a system are divided into multiple time-domain resource units, each time-domain resource set in the at least one time-domain resource set includes one or more continuous time-domain resource units, network equipment transmits the first downlink data to the terminal equipment through the first time-domain resource unit in the first time-domain resource set, moreover, terminal equipment and the network equipment may determine the second time-domain resource unit based on the location of the first time-domain resource unit in the first time-domain resource set, and the feedback information may be transmitted on the second time-domain resource unit, so that the feedback information may be transmitted beyond a restriction of the system, and transmission flexibility and reliability of the feedback information may be improved.

The method for transmitting feedback information according to the embodiments of the disclosure is described above in combination with FIG. 1 to FIG. 11 in detail, and feedback information transmission equipment according to the embodiments of the disclosure will be described below in combination with FIG. 14 and FIG. 15 in detail.

Figure 14:
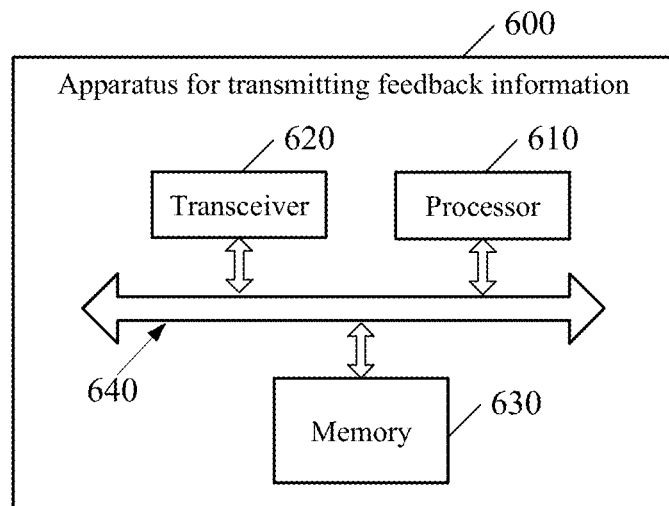
FIG. 14 is a schematic structure diagram of an example of an apparatus for transmitting feedback information according to an embodiment of the disclosure.

FIG. 14 is a schematic block diagram of an apparatus for transmitting feedback information 600 according to an embodiment of the disclosure. As shown in FIG. 14, the apparatus 600 includes: a processor 610 and a transceiver 620, and the processor 610 is connected with the transceiver 620. Optionally, the apparatus 600 further includes a memory 630, and the memory 630 is connected with the processor 610. Furthermore, the apparatus 600 optionally includes a bus system 640, wherein the processor 610, the memory 630 and the transceiver 620 may be connected through the bus system 640, the memory 630 may be configured to store an instruction, and the processor 610 may be configured to execute the instruction stored in the memory 630 to control the transceiver 620 to transmit information or a signal.

The processor 610 is configured to control the transceiver 620 to receive first downlink data in downlink data sent by network equipment, wherein the downlink data is sent by the network equipment by using at least one time-domain resource set, each time-domain resource set in the at least one time-domain resource set includes one or more continuous time-domain resource units, and the first downlink data is born in a first time-domain resource unit in a first time-domain resource set in the at least one time-domain resource set;

the processor 610 is configured to determine a second time-domain resource unit according to a location of the first time-domain resource unit in the first time-domain resource set; and the processor 610 is configured to control the transceiver 620 to transmit feedback information for the first downlink data on the second time-domain resource unit.

Optionally, a time length of each time-domain resource unit in multiple continuous time-domain resource units included in each time-domain resource set is the same; or the time lengths of at least two time-domain resource units in the multiple continuous time-domain resource units included in each time-domain resource set are different.

Optionally, the first time-domain resource set includes Q time-domain resource units, wherein $Q \geq T$, wherein T is a positive integer, a value of T is determined according to a system processing delay, and the processor 610 is configured to, if the first time-domain resource unit belongs to the first Q-T time-domain resource units in the first time-domain resource set on a time domain, determine, by the terminal equipment, that the second time-domain resource unit is located after the first time-domain resource set and an interval between a starting location of the second time-domain resource unit and an ending location of the last time-domain resource unit in the first time-domain resource set is A microseconds, wherein A is a preset value and $A \geq 0$.

Optionally, the first time-domain resource set includes Q time-domain resource units, wherein $Q \geq T$, wherein T is a positive integer, the value of T is determined according to the system processing delay, and the processor 610 is configured to, if the first time-domain resource unit belongs to the last T time-domain resource units in the first time-domain resource set on the time domain, determine, by the terminal equipment, that the second time-domain resource unit is located after a second time-domain resource set and an interval between the starting location of the second time-domain resource unit and an ending location of the last time-domain resource unit in the second time-domain resource set is A microseconds, wherein A is a preset value, $A \geq 0$ and the second time-domain resource set is the first time-domain resource set located after the first time-domain resource set on the time domain.

Optionally, the first time-domain resource set includes Q time-domain resource units, wherein $Q \geq T$, wherein T is a positive integer, the value of T is determined according to the system processing delay, and the processor 610 is configured to control the transceiver 620 to transmit C×L-bit feedback information to the network equipment in the second time-domain resource unit, the feedback information for the first downlink data belonging to the C×L-bit feedback information, wherein C is a maximum feedback information amount corresponding to downlink data transmitted in a time-domain resource unit, L is a positive integer and $L \geq Q$.

Optionally, the processor 610 is configured to determine a first bit in the second time-domain resource unit according to the location of the first time-domain resource unit in the first time-domain resource set; and the processor 610 is configured to control the transceiver 620 to bear the feedback information for the first downlink data in the first bit.

Optionally, the processor 610 is configured to control the transceiver 620 to receive at least one piece of set indication information, the at least one time-domain resource set corresponding to the at least one piece of set indication information one to one and each piece of set indication information being configured to indicate number information of the corresponding time-domain resource set.

The apparatus for transmitting feedback information 500 according to the embodiment of the disclosure may correspond to terminal equipment in the method according to the embodiments of the disclosure, and moreover, each unit, i.e., module, and abovementioned operations and/or functions in the apparatus for transmitting feedback information 500 are adopted to implement the corresponding flows of the method 200 in FIG. 2 and will not be elaborated herein for simplicity.

According to the apparatus for transmitting feedback information of the embodiment of the disclosure, time-domain resources provided by a system are divided into multiple time-domain resource units, each time-domain resource set in the at least one time-domain resource set includes one or more continuous time-domain resource units, network equipment transmits the first downlink data to the terminal equipment through the first time-domain resource unit in the first time-domain resource set, moreover, terminal equipment and the network equipment may determine the second time-domain resource unit based on the location of the first time-domain resource unit in the first time-domain resource set, and the feedback information may be transmitted on the second time-domain resource unit, so that the feedback information may be transmitted beyond a restriction of the system, and transmission flexibility and reliability of the feedback information may be improved.

Figure 15:
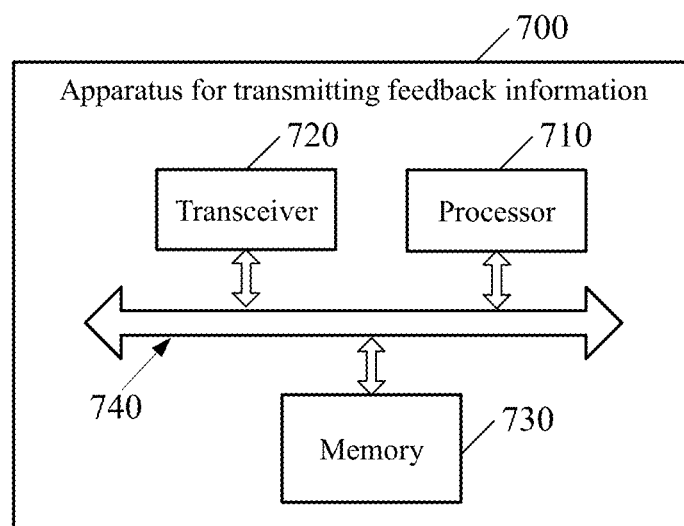
FIG. 15 is a schematic structure diagram of another example of an apparatus for transmitting feedback information according to an embodiment of the disclosure.

FIG. 15 is a schematic block diagram of another example of the apparatus for transmitting feedback information 700 according to an embodiment of the disclosure. As shown in FIG. 15, the apparatus 700 includes: a processor 710 and a transceiver 720, and the processor 710 is connected with the transceiver 720. Optionally, the apparatus 700 further includes a memory 730, and the memory 730 is connected with the processor 710. Furthermore, the apparatus 700 optionally includes a bus system 740, wherein the processor 710, the memory 730 and the transceiver 720 may be connected through the bus system 740, the memory 730 may be configured to store an instruction, and the processor 710 may be configured to execute the instruction stored in the memory 730 to control the transceiver 720 to transmit information or a signal.

The processor 710 is configured to control the transceiver 720 to transmit downlink data by using at least one time-domain resource set, each time-domain resource set in the at least one time-domain resource set including one or more continuous time-domain resource units, the downlink data including first downlink data sent to terminal equipment and the first downlink data being born in a first time-domain resource unit in a first time-domain resource set in the at least one time-domain resource set;

the processor 710 is configured to determine a second time-domain resource unit according to a location of the first time-domain resource unit in the first time-domain resource set; and the processor 710 is configured to control the transceiver 720 to receive feedback information for the first downlink data on the second time-domain resource unit.

Optionally, a time length of each time-domain resource unit in multiple continuous time-domain resource units included in each time-domain resource set is the same; or the time lengths of at least two time-domain resource units in the multiple continuous time-domain resource units included in each time-domain resource set are different.

Optionally, the first time-domain resource set includes Q time-domain resource units, wherein $Q \geqslant T$, wherein T is a positive integer, a value of T is determined according to a system processing delay, and the processor 710 is configured to, if the first time-domain resource unit belongs to the first Q-T time-domain resource units in the first time-domain resource set on a time domain, determine, by the network equipment, that the second time-domain resource unit is located after the first time-domain resource set and an interval between a starting location of the second time-domain resource unit and an ending location of the last time-domain resource unit in the first time-domain resource set is A microseconds, wherein A is a preset value and $A \geqslant 0$.

Optionally, the first time-domain resource set includes Q time-domain resource units, wherein $Q \geqslant T$, wherein T is a positive integer, a value of T is determined according to the system processing delay, and the processor 710 is specifically configured to, if the first time-domain resource unit belongs to the last T time-domain resource units in the first time-domain resource set on the time domain, determine, by the network equipment, that the second time-domain resource unit is located after a second time-domain resource set and an interval between the starting location of the second time-domain resource unit and an ending location of the last time-domain resource unit in the second time-domain resource set is A microseconds, wherein A is a preset value, $A \geqslant 0$ and the second time-domain resource set is the first time-domain resource set located after the first time-domain resource set on the time domain.

Optionally, the first time-domain resource set includes Q time-domain resource units, wherein $Q \geqslant T$, wherein T is a positive integer, a value of T is determined according to the system processing delay, and the processor 710 is configured to control the transceiver 720 to receive C×L-bit feedback information sent by the terminal equipment in the second time-domain resource unit, the feedback information for the first downlink data belonging to the C×L-bit feedback information, wherein C is a maximum feedback information amount corresponding to downlink data transmitted in a time-domain resource unit, L is a positive integer and $L \geqslant Q$.

Optionally, the processor 710 is configured to determine a first bit in the second time-domain resource unit according to the location of the first time-domain resource unit in the first time-domain resource set; and The processor 710 is configured to control the transceiver 720 to determine information born in the first bit as the feedback information for the first downlink data.

Optionally, the processor 710 is configured to control the transceiver 720 to transmit at least one piece of set indication information, the at least one time-domain resource set corresponding to the at least one piece of set indication information one to one and each piece of set indication information being configured to indicate number information of the corresponding time-domain resource set.

The feedback information transmission equipment 700 according to the embodiment of the disclosure may correspond to network equipment in the method according to the embodiments of the disclosure, and moreover, each unit, i.e., module, and abovementioned operations and/or functions in the feedback information transmission equipment 700 are adopted to implement the corresponding flows of the method 300 in FIG. 11 and will not be elaborated herein for simplicity.

According to the feedback information transmission equipment of the embodiment of the disclosure, time-domain resources provided by a system are divided into multiple time-domain resource units, each time-domain resource set in the at least one time-domain resource set includes one or more continuous time-domain resource units, network equipment transmits the first downlink data to the terminal equipment through the first time-domain resource unit in the first time-domain resource set, moreover, terminal equipment and the network equipment may determine the second time-domain resource unit based on the location of the first time-domain resource unit in the first time-domain resource set, and the feedback information may be transmitted on the second time-domain resource unit, so that the feedback information may be transmitted beyond a restriction of the system, and transmission flexibility and reliability of the feedback information may be improved.

It is noted that the method embodiment of the disclosure may be applied to a processor or implemented by the processor. The processor may be an integrated circuit chip with a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor or the like. The steps of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an EPROM, an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is noted that the memory of a system and method described in the disclosure is intended to include, but not limited to, memories of these and any other proper types.

It is noted that, in the embodiments of the disclosure, sequencing of each time-domain resource unit in the time-domain resource sets is calculated based on existence of the time-domain resource unit. For example, even if a time-domain resource unit is an incomplete time-domain resource unit (that is, a time length is smaller than a length of a complete time unit), when its location in a time-domain resource set is determined, it is also considered as a statistical member. For example, if the incomplete time-domain resource unit is arranged before each time-domain resource unit in the time-domain resource set on the time domain, it may be determined as the first time-domain resource unit in the time-domain resource set.

It should be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Those of ordinary skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by using different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the application, it should be understood that the disclosed system, apparatus and method may be implemented in another manner. For example, the apparatus embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the apparatus or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting feedback information, comprising:
receiving, by terminal equipment, first downlink data, wherein the first downlink data is born in a first time-domain resource unit in a first time-domain resource set, the first time-domain resource set comprises at least one time-domain resource unit;
determining, by the terminal equipment, transmitting feedback information for the first downlink data in a second time-domain resource unit according to a location of the first time-domain resource unit in the first time-domain resource set; and
transmitting, by the terminal equipment, L sets of feedback information in the second time-domain resource unit, wherein the L sets of feedback information comprise the feedback information for the first downlink data, each set of the L sets of feedback information comprises C-bit feedback information, $L \geqslant Q$, Q is a number of time-domain resource units comprised in the first time-domain resource set, C is a maximum feedback information amount corresponding to downlink data born in a time-domain resource unit.

2. The method according to claim 1, wherein $Q \geqslant T$, T is a positive integer, and a value of T is determined according to a system processing delay.

3. The method according to claim 2, wherein first Q-T time-domain resource units in the first time-domain resource set comprise the first time-domain resource unit.

4. The method according to claim 1, further comprising:
determining, by the terminal equipment, a bit position of the feedback information for the first downlink data in the L sets of feedback information according to the location of the first time-domain resource unit in the first time-domain resource set.

5. The method for transmitting feedback information according to claim 1, wherein the terminal equipment determines transmitting feedback information for the first downlink data in the second time-domain resource unit according to the location of the first time-domain resource unit in the first time-domain resource set and a system processing delay.

6. An apparatus for transmitting feedback information, comprising:
- a transceiver,
- a processor; and
- a memory for storing instructions,
- wherein the processor is configured to execute the instructions to:
    - control the transceiver to receive first downlink data, wherein the first downlink data is born in a first time-domain resource unit in a first time-domain resource set, the first time-domain resource set comprises at least one time-domain resource unit;
    - determine transmitting feedback information for the first downlink data in a second time-domain resource unit according to a location of the first time-domain resource unit in the first time-domain resource set; and
    - control the transceiver to transmit L sets of feedback information in the second time-domain resource unit, wherein the L sets of feedback information comprise the feedback information for the first downlink data, each set of the L sets of feedback information comprises C-bit feedback information, $L \geq Q$ is a number of time-domain resource units comprised in the first time-domain resource set, C is a maximum feedback information amount corresponding to downlink data born in a time-domain resource unit.

7. The apparatus according to claim 6, wherein $Q \geq T$, T is a positive integer, and a value of T is determined according to a system processing delay.

8. The apparatus according to claim 7, wherein first Q-T time-domain resource units in the first time-domain resource set comprise the first time-domain resource unit.

9. The apparatus according to claim 6, wherein the processor is further configured to:
- determine a bit position of the feedback information for the first downlink data in the L sets of feedback information according to the location of the first time-domain resource unit in the first time-domain resource set.

10. The apparatus for transmitting feedback information according to claim 6, wherein the processor is configured to execute the instructions to determine transmitting feedback information for the first downlink data in the second time-domain resource unit according to the location of the first time-domain resource unit in the first time-domain resource set and a system processing delay.

* * * * *